US012784001B2

(12) United States Patent
Miyamoto

(10) Patent No.: US 12,784,001 B2
(45) Date of Patent: Nov. 3, 2026

(54) PROOFREADING ASSISTANCE METHOD AND PROOFREADING ASSISTANCE SYSTEM

(71) Applicant: SCREEN Holdings Co., Ltd., Kyoto (JP)

(72) Inventor: Katsumichi Miyamoto, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 218 days.

(21) Appl. No.: 18/840,153

(22) PCT Filed: Nov. 28, 2022

(86) PCT No.: PCT/JP2022/043692
§ 371 (c)(1),
(2) Date: Aug. 21, 2024

(87) PCT Pub. No.: WO2023/181503
PCT Pub. Date: Sep. 28, 2023

(65) Prior Publication Data

US 2025/0165925 A1 May 22, 2025

(30) Foreign Application Priority Data

Mar. 24, 2022 (JP) ................................ 2022-047872

(51) Int. Cl.
*G06V 10/75* (2022.01)
*G06F 3/12* (2006.01)
*G06Q 10/101* (2023.01)

(52) U.S. Cl.
CPC ......... *G06Q 10/101* (2013.01); *G06F 3/1208* (2013.01); *G06F 3/1262* (2013.01); *G06F 3/1284* (2013.01); *G06V 10/751* (2022.01)

(58) Field of Classification Search
CPC .... G06F 3/1208; G06F 3/1262; G06F 3/1284; G06V 10/751
See application file for complete search history.

(56) References Cited

U.S. PATENT DOCUMENTS 6,384,932 B1 * 5/2002 Fujisawa ................ B41B 27/00 358/1.9
10,664,203 B2 * 5/2020 Kaneko ................ G06K 15/005
(Continued)

FOREIGN PATENT DOCUMENTS

JP 2004-310747 A 11/2004
JP 2009-301553 A 12/2009
(Continued)

OTHER PUBLICATIONS

International Search Report (with English translation) and Written Opinion dated Jan. 31, 2023, from corresponding International Application No. PCT/JP2022/043692, 9 pages.

*Primary Examiner* — Tadesse Hailu
(74) *Attorney, Agent, or Firm* — Rimon P.C.

(57) ABSTRACT

Provided are a proofreading assistance method and a proofreading assistance system that achieve improvement in efficiency of proofreading work and reduction in errors in proofreading work in a case where there are a plurality of print jobs related to each other. After registering a plurality of print jobs including a master job and general jobs, a computer performs automatic grouping processing of comparing image data corresponding to each of the general jobs with image data corresponding to the master job and defining a plurality of print jobs related to each other as related job group. When a common comment is inputted to a common image area of a proofreading image corresponding to one print job included in the related job group, the computer reflects the common comment on the proofreading
(Continued)

image corresponding to another print job constituting the related job group.

15 Claims, 18 Drawing Sheets

(56) References Cited

U.S. PATENT DOCUMENTS

| | | | | |
|---|---|---|---|---|
| 2004/0172377 | A1 | 9/2004 | Saitou et al. | |
| 2004/0190057 | A1 | 9/2004 | Takahashi et al. | |
| 2004/0257624 | A1* | 12/2004 | Miyamoto | G06F 3/1204 358/3.06 |
| 2009/0310152 | A1 | 12/2009 | Roulland et al. | |
| 2011/0286040 | A1* | 11/2011 | Seto | G06T 11/60 358/1.15 |
| 2012/0069384 | A1* | 3/2012 | De Boer | G06F 3/121 358/1.14 |
| 2012/0254741 | A1* | 10/2012 | Watanabe | G06T 7/0004 715/255 |
| 2019/0317702 | A1* | 10/2019 | Kaneda | G06F 3/122 |
| 2021/0103411 | A1* | 4/2021 | Kumahashi | G06F 3/1248 |

FOREIGN PATENT DOCUMENTS

| | | | |
|---|---|---|---|
| JP | 2020-154410 | A | 9/2020 |
| WO | 2003/010683 | A1 | 2/2003 |

* cited by examiner

| J 1 | J 2 | J 3 | |
|---|---|---|---|
| FIRST PAGE | FIRST PAGE | FIRST PAGE | |
| SECOND PAGE | | SECOND PAGE | |
| FOURTH PAGE | THIRD PAGE | FOURTH PAGE | ← 69 |

Fig.8

| | | |
|---|---|---|
| RELATED JOB GROUP | J 1 | J 2 |

Fig.9

| | | | |
|---|---|---|---|
| RELATED JOB GROUP | J 1 | J 2 | J 3 |

PROOFREADING ASSISTANCE METHOD AND PROOFREADING ASSISTANCE SYSTEM

CROSS-REFERENCE TO RELATED APPLICATIONS

This application is the U.S. National Phase under 35 U.S.C. § 371 of International Application No. PCT/JP2022/043692, filed on Nov. 28, 2022, which claims the benefit of foreign priority to Japan Patent Application No. 2022-047872 filed on Mar. 24, 2022, the entire contents of each of which are hereby incorporated by reference.

TECHNICAL FIELD

The present invention relates to a proofreading assistance method and a proofreading assistance system that assist proofreading work performed before printing.

BACKGROUND ART

In a printing business, an image based on print data generated by RIP processing may be proofread as a proofreading image before printing by a printing device is actually performed. In this regard, conventionally, exchange of proofreading images, correction instructions, and the like between workers related to proofreading has been performed on a paper basis, but in recent years, online proofreading systems that enable online proofreading have been introduced in many printing companies. The invention relating to such an online proofreading system is disclosed in, for example, WO 2003/010683 A. According to this invention, a plurality of operators can perform proofreading work in parallel at the same time, and each person in charge of proofreading can check details of a proofreading and a proofreading status in real time by a web browser.

PRIOR ART DOCUMENT

Patent Document

[Patent Document 1] WO 2003/010683 A

SUMMARY OF THE INVENTION

Problems to be Solved by the Invention

According to the conventional online proofreading system, it is assumed that proofreading work is performed for each print job. Therefore, even in a case where the same correction instruction is given to different print jobs, the operator needs to give a correction instruction for each print job. In this regard, a schematic procedure of proofreading work in a case where the conventional online proofreading system is adopted will be described with reference to FIG. 20. Note that, here, attention is focused on a case where an order for printing based on two print jobs (job J1 and job J2) is placed from a customer company to a printing company, and the same correction instruction is given for the two print jobs in the proofreading work. Furthermore, it is assumed that the job J1 and the job J2 are print jobs including a plurality of pages.

When an order for printing is placed from a customer company to a printing company, a manuscript based on details of the order is created in a predetermined production company. Here, in the production company, the first drafts (first manuscripts) of the job J1 and the job J2 (step S90) are created. Note that the data of the created manuscript is transmitted to the printing company as submitted data. Next, in the printing company, registration of the print jobs (job J1 and job J2) in the online proofreading system is performed on the basis of the submitted data (step S91). Next, in the printing company, RIP processing is performed on the submitted data of the job J1 and the job J2 (step S92). As a result, a proofreading image used for proofreading work in the customer company or the production company is created. Next, a correction instructor who is a person in charge of proofreading in the customer company checks the proofreading image and gives a correction instruction for the job J1 (for example, inputs a comment on the proofreading image) (step S93). Then, in the production company, a correction operator corrects the manuscript of the job J1 in accordance with the correction instruction in step S93 (step S94). Next, the correction instructor prints the details of the correction instruction for the job J1 (step S95). Moreover, the correction instructor gives a correction instruction for the job J2 while viewing a printed matter obtained in step S95 (for example, inputs a comment on the proofreading image) (step S96). Then, in the production company, the correction operator corrects the manuscript of the job J2 in accordance with the correction instruction in step S96 (step S97). The data of the corrected manuscripts obtained in steps S94 and S97 is transmitted to the printing company. In this manner, the first proof (first proofreading work) ends. The processing in steps S92 to S97 is repeated until approval by an approver of the customer company is obtained. That is, the proofreading work is performed until the approval by the approver of the customer company is obtained. Note that the second proofreading work is called a "second proof" or a "revised proof", and the third proofreading work is called a "third proof".

As above, the correction instructor (the person in charge of proofreading in the customer company) needs to print the details of the correction instruction for the job J1 in order to secure the printed matter as a copy of the details of the correction instruction after giving the correction instruction for the job J1. Then, in step S96 described above, the correction instructor needs to find a page to which the same correction instruction as that for the job J1 should be given from among a plurality of pages constituting the job J2 on a screen of a computer while viewing the printed matter. Furthermore, the approver of the customer company needs to perform visual check work (visual plate inspection) in order to confirm whether the correction of the same details as the correction for the job J1 has been correctly made for the job J2. As just described, according to the conventional online proofreading system, the proofreading work is inefficient. Furthermore, since a lot of work requires time and effort, errors are likely to occur in the proofreading work.

In view of the above circumstances, an object of the present invention is to provide a proofreading assistance method and a proofreading assistance system that can achieve improvement in efficiency of proofreading work and reduction in errors in proofreading work in a case where there are a plurality of print jobs related to each other.

Means for Solving the Problems

A first aspect of the present invention is directed to a proofreading assistance method that assists proofreading of an image to be printed, the proofreading assistance method including:

a print job registration step of, by an operator, registering K print jobs including one master job and (K−1) general jobs on a computer, the K print jobs each being associated with image data representing an image to be printed, where K is an integer of 2 or more;

an image data comparison step of, by the computer, comparing image data corresponding to each general job with image data corresponding to the master job to obtain a matching rate between an image corresponding to each general job and an image corresponding to the master job, and a common image area that is an image portion common between the image corresponding to each general job and the image corresponding to the master job;

a grouping step of, by the computer, defining a set of (N+1) print jobs including the master job and N general jobs as a related job group based on the matching rate obtained in the image data comparison step, where N is an integer of (K−1) or less;

a comment input step of, by an operator, inputting a comment regarding proofreading for an image corresponding to a proofreading target job with designating a comment input area in a state where the image corresponding to the proofreading target job is displayed on a display unit of the computer, the proofreading target job being one of the (N+1) print jobs; and a comment reflection step of, by the computer, reflecting a comment inputted with designating the common image area as the comment input area in the comment input step in an area corresponding to the comment input area, the area corresponding to the comment input area being in an image corresponding to a print job other than the proofreading target job among the (N+1) print jobs.

According to a second aspect of the present invention, in the first aspect of the present invention, in the image data comparison step, the matching rate is obtained for each combination of an image corresponding to one page of each general job and an image corresponding to one page of the master job, and the grouping step includes:

a related page pair setting step of, by the computer, defining two pages constituting the combination for which the matching rate greater than or equal to a predetermined threshold is obtained in the image data comparison step as a related page pair; and a related job group determination step of, by the computer, determining, with the (K−1) general jobs as a determination target job one by one, whether or not to include the determination target job in the related job group based on a result obtained in the related page pair setting step.

According to a third aspect of the present invention, in the second aspect of the present invention, in the related job group determination step, when at least one page of the determination target job is defined as the related page pair in the related page pair setting step, it is determined that the determination target job is included in the related job group.

According to a fourth aspect of the present invention, in the second aspect of the present invention, in the related job group determination step, when all pages of the determination target job are defined as the related page pair in the related page pair setting step, it is determined that the determination target job is included in the related job group.

According to a fifth aspect of the present invention, in the second aspect of the present invention, in the related job group determination step, when a predetermined ratio or more of pages among all pages of the determination target job are defined as the related page pair in the related page pair setting step, it is determined that the determination target job is included in the related job group.

According to a sixth aspect of the present invention, in the first aspect of the present invention, the proofreading assistance method further includes a multiple-image display step of, by the computer, displaying images respectively corresponding to two or more print jobs among the (N+1) print jobs side by side on the display unit, wherein in a state in which images respectively corresponding to a first job and a second job that are two print jobs included in the related job group are displayed side by side on the display unit, when a display page for an image corresponding to the first job is changed to one of two pages constituting a related page pair by an operator, the computer changes a display page for an image corresponding to the second job to another of the two pages constituting the related page pair.

According to a seventh aspect of the present invention, in the first aspect of the present invention, the proofreading assistance method further includes a multiple-image display step of, by the computer, displaying images respectively corresponding to two or more print jobs among the (N+1) print jobs side by side on the display unit.

According to an eighth aspect of the present invention, in the seventh aspect of the present invention, in the comment reflection step, the comment inputted with designating the common image area as the comment input area in the comment input step is reflected only on an image displayed on the display unit.

According to a ninth aspect of the present invention, in the seventh aspect of the present invention, in the comment reflection step, the comment inputted with designating the common image area as the comment input area in the comment input step is reflected on an image corresponding to each of all print jobs other than the proofreading target job among the (N+1) print jobs.

According to a tenth aspect of the present invention, in the first aspect of the present invention, when an image corresponding to the master job and an image corresponding to one of the N general jobs are displayed on the display unit in the multiple-image display step, mask display that displays an image of a specific pattern without displaying an image based on corresponding image data is performed for a different image area that is an area other than the common image area.

According to an eleventh aspect of the present invention, in the tenth aspect of the present invention, the proofreading assistance method further includes a mask display setting step of, by an operator, setting whether to enable or disable the mask display, wherein the mask display is performed only in a case where a setting is made to enable the mask display in the mask display setting step.

According to a twelfth aspect of the present invention, in the first aspect of the present invention, when an image corresponding to the master job and an image corresponding to one of the N general jobs are displayed on the display unit in the multiple-image display step, a different image area that is an area other than the common image area is highlighted.

According to a thirteenth aspect of the present invention, in the first aspect of the present invention, a common comment and a normal comment are provided as comments that can be inputted in the comment input step, and in the comment reflection step, the computer reflects only the common comment in an area corresponding to the comment input area, the area corresponding to the comment input area being in an image corresponding to a print job other than the proofreading target job among the (N+1) print jobs.

According to a fourteenth aspect of the present invention, in the first aspect of the present invention, in the comment reflection step, the computer does not reflect a comment inputted to a different image area that is an area other than the common image area in the comment input step in an image corresponding to any of the print jobs.

A fifteenth aspect of the present invention is directed to a proofreading assistance system that assists proofreading of an image to be printed, the proofreading assistance system comprising:

a print job registration unit configured to register, by an operator, K print jobs including one master job and (K−1) general jobs, the K print jobs each being associated with image data representing an image to be printed, where K is an integer of 2 or more;

an image data comparison unit configured to compare image data corresponding to each general job with image data corresponding to the master job to obtain a matching rate between an image corresponding to each general job and an image corresponding to the master job, and a common image area that is an image portion common between the image corresponding to each general job and the image corresponding to the master job;

a grouping unit configured to define a set of (N+1) print jobs including the master job and N general jobs as a related job group based on the matching rate obtained by the image data comparison unit, where N is an integer of (K−1) or less;

a comment input reception unit configured to, in a state where an image corresponding to a proofreading target job that is one of the (N+1) print jobs is displayed on a display unit of a computer via a network, receive an input of a comment regarding proofreading for the image corresponding to the proofreading target job, the comment being inputted to a comment input area designated by an operator; and a comment reflection unit configured to reflect, in an area corresponding to the comment input area, a comment inputted with designating the common image area as the comment input area by an operator among comments received by the comment input reception unit, the area corresponding to the comment input area being in an image corresponding to a print job other than the proofreading target job among the (N+1) print jobs.

Effects of the Invention

According to the first aspect of the present invention, by processing of the computer, image data corresponding to a print job (the general jobs) other than a print job registered as a master job is compared with image data corresponding to the master job, and a set of a plurality of the print jobs that are highly related to each other and include the master job is defined as a related job group. Then, when an operator inputs, in a state where an image corresponding to a proofreading target job (one of the plurality of print jobs constituting the related job group) is displayed on the display unit, a comment with designating a common image area (an image portion common between an image corresponding to the general job and an image corresponding to the master job) in the image as the comment input area, the computer reflects the comment on an image corresponding to a print job other than the proofreading target job among the plurality of print jobs constituting the related job group. Therefore, in a case where it is necessary to give the same correction instruction for a plurality of print jobs highly related to each other, a correction instructor may input a comment of the correction instruction for only one print job. Accordingly, the correction instructor can give the correction instruction to a correction operator more efficiently and reliably than before. From the above, the efficiency of the proofreading work and the reduction in errors in the proofreading work in a case where there are a plurality of print jobs related to each other are realized.

According to the second aspect of the present invention, it is possible to set the related job group in consideration of the matching rate of the images in units of pages between the master job and the general job.

According to the third aspect of the present invention, as many print jobs as possible can be included in the related job group.

According to the fourth aspect of the present invention, it is possible to include only a print job extremely highly related to the master job in the related job group.

According to the fifth aspect of the present invention, the same effect as that of the second aspect of the present invention can be obtained.

According to the sixth aspect of the present invention, in a state in which two images corresponding to the two print jobs related to each other are displayed, when an operator changes the display page for an image corresponding to one print job, in conjunction with the change, the display page for an image corresponding to the other print job is also changed. As a result, an operation burden on the operator for changing the display page is reduced.

According to the seventh aspect of the present invention, since it is possible to perform proofreading work while comparing a plurality of images corresponding to a plurality of print jobs on a screen, it is possible to perform proofreading work for plurality of print jobs related to each other significantly more efficiently than before.

According to the eighth aspect of the present invention, reflection of a comment on an image corresponding to a print job not intended by a correction instructor is prevented.

According to the ninth aspect of the present invention, in a case where it is necessary to give the same correction instruction for a plurality of print jobs highly related to each other, an operation burden on the operator for inputting the comment of the correction instruction is greatly reduced.

According to the tenth aspect of the present invention, it is possible to prevent a correction instructor from erroneously giving the same correction instruction for a plurality of images having different contents.

According to the eleventh aspect of the present invention, the same effect as that of the tenth aspect of the present invention can be obtained.

According to the twelfth aspect of the present invention, the same effect as that of the tenth aspect of the present invention can be obtained.

According to the thirteenth aspect of the present invention, it is possible to perform proofreading work more efficiently by selectively using the two types of comments.

According to the fourteenth aspect of the present invention, it is possible to prevent a correction instructor from erroneously giving the same correction instruction for a plurality of images having different contents.

According to the fifteenth aspect of the present invention, the same effect as that of the first aspect of the present invention can be obtained.

BRIEF DESCRIPTION OF THE DRAWINGS

FIG. 8 is a diagram for explaining a related job group in the embodiment.

FIG. 9 is a diagram for explaining the related job group in the embodiment.

MODE FOR CARRYING OUT THE INVENTION

Hereinafter, an embodiment of the present invention will be described with reference to the accompanying drawings.

1. Configuration of Printing System

Figure 1:
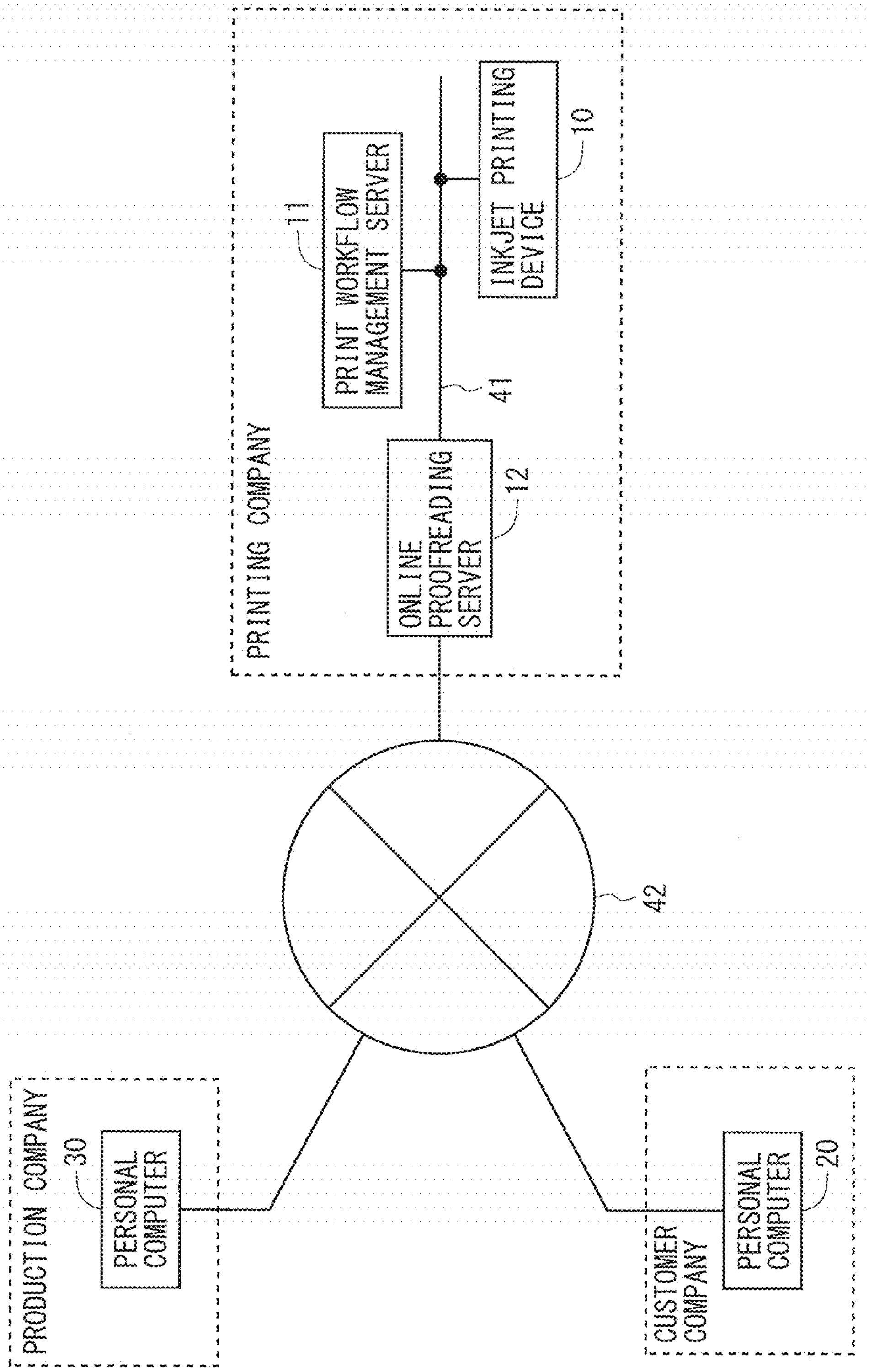
FIG. 1 is a block diagram illustrating an overall configuration of a printing system according to an embodiment of the present invention.

FIG. 1 is a block diagram illustrating an overall configuration of a printing system according to the present embodiment. The printing system includes an inkjet printing device 10, a print workflow management server 11, an online proofreading server 12, a personal computer 20, and a personal computer 30. The inkjet printing device 10, the print workflow management server 11, and the online proofreading server 12 are installed in a printing company. The personal computer 20 is installed in a customer company. The personal computer 30 is installed in a production company. The inkjet printing device 10, the print workflow management server 11, and the online proofreading server 12 are connected by a LAN 41 in the printing company. The online proofreading server 12, the personal computer 20, and the personal computer 30 are connected via the Internet 42.

The personal computer 20 installed in the customer company is used for ordering printing and correction instructions at the time of proofreading work. The personal computer 30 installed in the production company is used to create a manuscript based on the details of the order (create submitted data for printing) and correct the manuscript at the time of proofreading work. In the online proofreading server 12, a program for realizing an online proofreading system is installed. That is, in response to a request from a personal computer (the personal computer 20 installed in the customer company or the personal computer 30 installed in the production company) via the Internet 42, the online proofreading server 12 displays a screen for proofreading work (hereinafter, the screen is referred to as "proofreading screen") on a display unit of the personal computer, receives an input of a comment from the personal computer, and the like. In the present embodiment, the online proofreading system includes a proofreading assistance system that provides a function of assisting the proofreading work by an operator. Note that it is assumed that RIP processing is also performed by the online proofreading server 12. Data of the print job for which approval by an approver of the customer company has been obtained fora proofreading image is given to the print workflow management server 11. In the print workflow management server 11, a program for realizing a print workflow system that manages a series of processing for performing printing using the inkjet printing device 10 is installed. That is, the print workflow management server 11 manages the print workflow. For example, processing of determining a print order for a plurality of print jobs such that printing is performed efficiently is performed. The inkjet printing device 10 outputs a print image by ejecting ink onto a printing paper as a base material without using a printing plate based on print data generated by the RIP processing (that is, performs printing).

Note that the above-described configuration is an example, and various other configurations can be adopted. For example, it is also possible to adopt a configuration in which the RIP processing is performed by the print workflow management server 11 or a server dedicated to the RIP processing. Thus, the online proofreading system may be realized by cooperation between the online proofreading server 12 and another server. Furthermore, instead of the configuration of carrying out printing by the inkjet printing device 10, a configuration of carrying out printing using a printing plate (for example, a configuration including a plate-making device and an offset printing device) can also be adopted. Moreover, a configuration capable of both printing by the inkjet printing device 10 and printing using the printing plate can also be adopted.

2. Configuration of Computer Constituting Printing System

Figure 2:
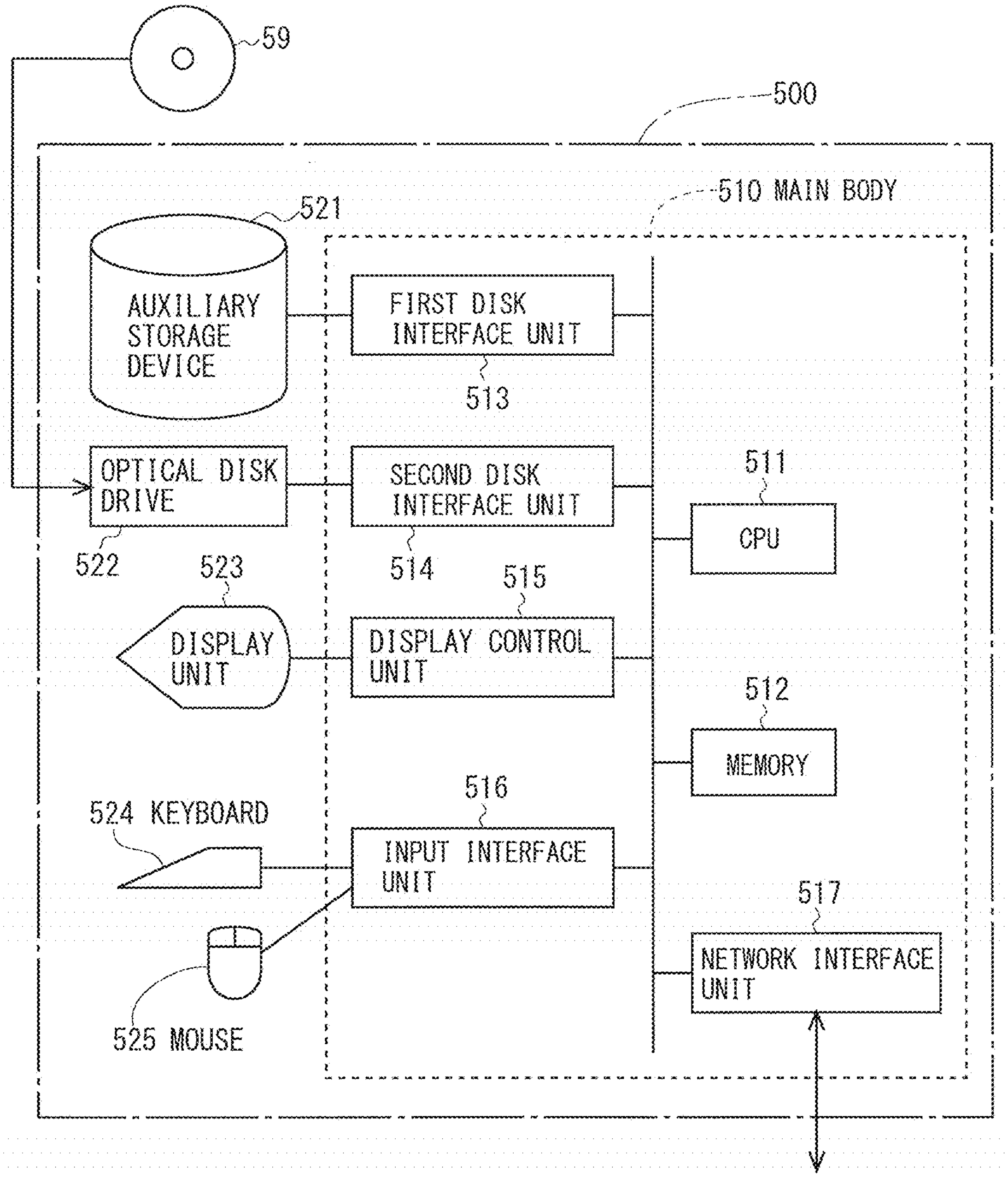
FIG. 2 is a block diagram illustrating a configuration of a computer included in the printing system according to the embodiment.

FIG. 2 is a block diagram illustrating a configuration of a computer 500 included in the printing system according to the present embodiment. The print workflow management server 11, the online proofreading server 12, the personal computer 20, and the personal computer 30 are the computer 500. The computer 500 illustrated in FIG. 2 includes a main body 510, an auxiliary storage device 521, an optical disk drive 522, a display unit 523, a keyboard 524, a mouse 525, and the like. The main body 510 includes a CPU 511, a memory 512, a first disk interface unit 513, a second disk interface unit 514, a display control unit 515, an input interface unit 516, and a network interface unit 517. The CPU 511, the memory 512, the first disk interface unit 513, the second disk interface unit 514, the display control unit 515, the input interface unit 516, and the network interface unit 517 are connected to each other via a system bus. The auxiliary storage device 521 is connected to the first disk interface unit 513. The auxiliary storage device 521 is a magnetic disk device or the like. The optical disk drive 522 is connected to the second disk interface unit 514. An optical disk 59 as a computer-readable recording medium such as a CD-ROM or a DVD-ROM is inserted into the optical disk drive 522. The display unit (display device) 523 is connected to the display control unit 515. The display unit 523 is a liquid crystal display or the like. The display unit 523 is used to display information desired by an operator. The keyboard 524 and the mouse 525 are connected to the input interface unit 516. The keyboard 524 and the mouse 525 are used by an operator to input instructions to the computer 500. The network interface unit 517 is an interface circuit for communication.

The auxiliary storage device 521 stores a program to be executed by the computer 500 and various data. The CPU 511 reads the program stored in the auxiliary storage device 521 into the memory 512 and executes the program, thereby implementing various functions. The memory 512 includes RAM and a ROM. The memory 512 functions as a work area for the CPU 511 to execute the program stored in the auxiliary storage device 521. Note that the program is provided by being stored in, for example, the computer-readable recording medium (non-transitory recording medium).

3. Functional Configuration

Figure 3:
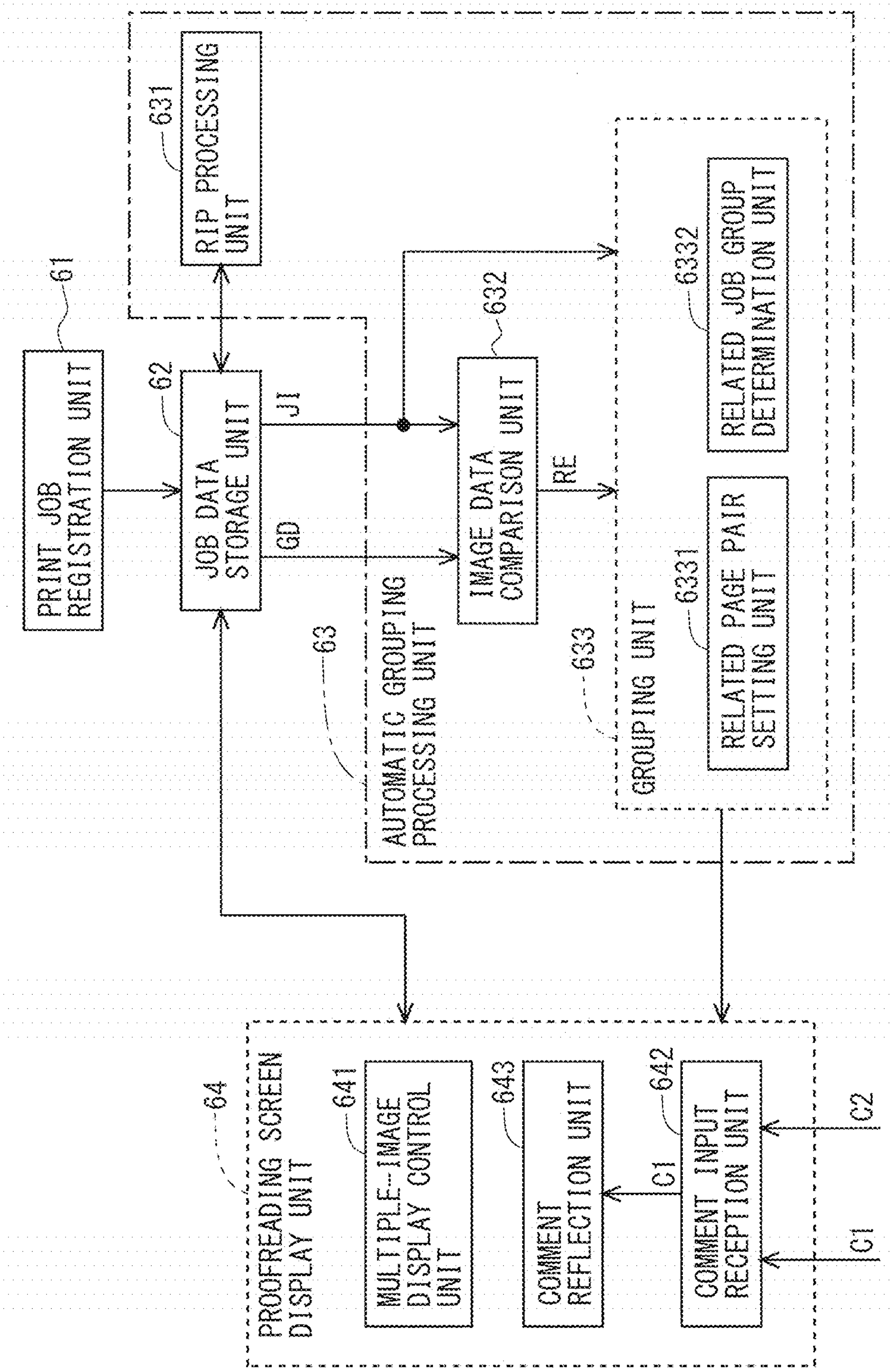
FIG. 3 is a block diagram illustrating a functional configuration of a proofreading assistance system (system for realizing a proofreading assistance method) in the embodiment.

FIG. 3 is a block diagram illustrating a functional configuration of a proofreading assistance system (system for realizing a proofreading assistance method) in the present embodiment. As illustrated in FIG. 3, the proofreading assistance system includes a print job registration unit 61, a job data storage unit 62, an automatic grouping processing unit 63, and a proofreading screen display unit 64. The automatic grouping processing unit 63 includes an RIP processing unit 631, an image data comparison unit 632, and a grouping unit 633. The grouping unit 633 includes a related page pair setting unit 6331 and a related job group determination unit 6332. The proofreading screen display unit 64 includes a multiple-image display control unit 641, a comment input reception unit 642, and a comment reflection unit 643.

The print job registration unit 61 registers a print job associated with image data representing an image to be printed on the basis of an operation of the operator. In this regard, in the present embodiment, one print job can be registered as a master job for each coherent multiple print jobs. Note that, in the present specification, a print job other than the master job is referred to as a "general job" for convenience. From the above, the print job registration unit 61 registers K print jobs, which are K print jobs each being associated with image data representing an image to be printed, including one master job and (K−1) general jobs, where K is an integer of 2 or more, on the basis of a operator's operation.

The job data storage unit 62 stores data (hereinafter, it is referred to as "job data") of the print job registered by the print job registration unit 61. The job data includes, in addition to image data to be printed, various types of information (for example, paper size information) necessary for execution of printing. Note that the job data storage unit 62 stores image data before the RIP processing and image data after the RIP processing. Furthermore, the job data storage unit 62 stores image data before proofreading and image data after proofreading. Moreover, the job data storage unit 62 also stores image data to which a comment of a correction instruction is added.

The automatic grouping processing unit 63 performs automatic grouping processing described later that automatically groups a plurality of print jobs related to each other.

The RIP processing unit 631 performs the RIP processing on image data included in job data stored in the job data storage unit 62. As a result, a proofreading image that is an image used for proofreading work in the customer company and the production company is created.

The image data comparison unit 632 compares image data corresponding to each general job with image data corresponding to the master job based on image data GD after the RIP processing for a plurality of print jobs and job information JI including information indicating whether each print job is the master job or the general job. As a result, as a comparison result RE, a matching rate between an image corresponding to each general job and an image corresponding to the master job and a common image area that is an image portion common between the image corresponding to each general job and the image corresponding to the master job are obtained. Note that the calculation of the matching rate by the image data comparison unit 632 is performed for each combination of an image corresponding to one page of each general job and an image corresponding to one page of the master job.

The grouping unit 633 groups the master job and one or more general jobs highly related to the master job as a related job group whose main is the master job, on the basis of the comparison result RE obtained by the processing of the image data comparison unit 632 and the job information JI. In this regard, which general job is to be included in the related job group is determined based on the matching rate. When one master job and (K−1) general jobs are registered by the print job registration unit 61 (where K is an integer of 2 or more), a maximum of (K−1) general jobs are included in a related job group whose main is the master job.

From the above, the grouping unit 633 defines a set of (N+1) print jobs including the master job and the N general jobs as a related job group based on the matching rate obtained by the image data comparison unit 632, with N as an integer of (K−1) or less.

The related page pair setting unit 6331 defines, as a related page pair, two pages constituting a combination for which a matching rate greater than or equal to a predetermined threshold is obtained by the data comparison unit 632. By the way, as described above, the calculation of the matching rate by the image data comparison unit 632 is performed for each combination of the image corresponding to one page of each general job and the image corresponding to one page of the master job. For example, when the image data of the master job is data for 4 pages and the image data of the general job to be compared is data for 3 pages, the following 12 matching rates are calculated by comparing the image data of the master job with the image data of the general job to be compared.

(1) Matching rate between the first page of the general job and the first page of the master job (2) Matching rate between the first page of the general job and the second page of the master job (3) Matching rate between the first page of the general job and the third page of the master job (4) Matching rate between the first page of the general job and the fourth page of the master job (5) Matching rate between the second page of the general job and the first page of the master job (6) Matching rate between the second page of the general job and the second page of the master job (7) Matching rate between the second page of the general job and the third page of the master job (8) Matching rate between the second page of the general job and the fourth page of the master job (9) Matching rate between the third page of the general job and the first page of the master job

(10) Matching rate between the third page of the general job and the second page of the master job

(11) Matching rate between the third page of the general job and the third page of the master job

(12) Matching rate between the third page of the general job and the fourth page of the master job Then, two pages (one page of the general job and one page of the master job) constituting the combination for which the matching than or equal to the predetermined threshold is obtained are defined as a related page pair. However, when the threshold is not suitably set, it is conceivable that the matching rate for a plurality of pages of the master job is greater than or equal to the threshold for a certain page of the general job. For example, in the above example, it is conceivable that the matching rate between the first page of the general job and the second page of the master job is greater than or equal to the threshold, and the matching rate between the first page of the general job and the third page of the master job is greater than or equal to the threshold. In such a case, for example, only two pages constituting the combination for which the highest matching rate is obtained may be defined as the related page pair.

The related job group determination unit 6332 determines whether or not to include each general job in a related job group whose main is the master job. At that time, when (K−1) general jobs are registered by the print job registration unit 61 as described above, the (K−1) general jobs are sequentially taken as a determination target one by one. Furthermore, in the determination, the information of the related page pair defined by the related page pair setting unit 6331 is referred to. From the above, the related job group determination unit 6332 determines whether or not to include a determination target job in the related job group on the basis of the information of the related page pair defined by the related page pair setting unit 6331 with (K−1) general jobs as the determination target jobs one by one. Specific examples of the determination method include the following three examples.

(First example) When at least one page of the determination target job is defined as a related page pair by the related page pair setting unit 6331, the determination target job is included in the related job group.

(Second example) When all the pages of the determination target job are defined as a related page pair by the related page pair setting unit 6331, the determination target job is included in the related job group.

(Third example) When a predetermined ratio or more of pages among all pages of the determination target job are defined as the related page pair by the related page pair setting unit 6331, the determination target job is included in the related job group.

The proofreading screen display unit 64 displays a proofreading screen on the display unit of the personal computer 20 of the customer company or the personal computer 30 of the production company in response to a request from the personal computer 20 or the personal computer 30, and receives an operation by the operator.

The multiple-image display control unit 641 displays the plurality of proofreading images respectively corresponding to the plurality of print jobs included in the related job group side by side on the display unit of the personal computer 20 or the personal computer 30. Note that, typically, the proofreading image corresponding to the master job and the proofreading image corresponding to the general job are displayed side by side. Meanwhile, the multiple-image display control unit 641 is a component provided in the online proofreading server 12, and the proofreading image is displayed on the display unit of the personal computer 20 in the customer company or the personal computer 30 in the production company. Furthermore, as described above, a set of (N+1) print jobs is defined as a related job group by the grouping unit 633. Thus, the multiple-image display control unit 641 causes the display unit to display images corresponding to two or more print jobs among the (N+1) print jobs side by side via a network. Furthermore, in a state in which two proofreading images corresponding to two print jobs included in the related job group are displayed side by side on the display unit, when the display page for the proofreading image corresponding to one print job is changed by the operator, in conjunction with the change, the display page for the proofreading image corresponding to the other print job is also changed. That is, in a state in which the images respectively corresponding to two print jobs (here, a first job and a second job) included in the related job group are displayed side by side on the display unit, when the display page for the image corresponding to the first job is changed to one of the two pages constituting the related page pair by the operator, the multiple-image display control unit 641 changes the display page for the image corresponding to the second job to the other of the two pages constituting the related page pair.

The comment input reception unit 642 receives an input, by the operator, of a comment related to proofreading in a state where the proofreading image corresponding to the print job to be proofread is displayed on the display unit. In this regard, the operator inputs a comment after designating a comment input area. Meanwhile, the comment input reception unit 642 is a component provided in the online proofreading server 12, and the proofreading image is displayed on the display unit of the personal computer 20 in the customer company or the personal computer 30 in the production company. Furthermore, as described above, a set of (N+1) print jobs is defined as a related job group by the grouping unit 633. Thus, the comment input reception unit 642 receives, in a state where the image corresponding to the proofreading target job that is one of the (N+1) print jobs is displayed on the display unit of the computer via the network, an input of a comment regarding proofreading for the image corresponding to the proofreading target job, which is a comment inputted to the comment input area designated by the operator. Note that, in the present embodiment, a common comment C1 and a normal comment C2 are provided as comments that can be inputted by the operator. The common comment C1 is a comment to be used when it is desired to input an instruction of the same details for a plurality of print jobs. The normal comment C2 is a comment to be used when it is desired to input an instruction for one print job.

When a comment inputted by the operator is a comment inputted to the common image area obtained by the image data comparison unit 632, the comment reflection unit 643 reflects the comment in the common image area of the proofreading image corresponding to another print job constituting the related job group. In other words, the comment reflection unit 643 reflects, in an area corresponding to the comment input area, a comment inputted with designating the common image area as the comment input area by the operator among comments received by the comment input reception unit 642, the area corresponding to the comment input area being in an image corresponding to a print job other than the proofreading target job among the (N+1) print jobs (print jobs included in a related job group whose main is the master job). However, in the present embodiment, only the common comment C1 is taken as a processing target of the comment reflection unit 643.

4. Procedure of Proofreading Work

Figure 4:
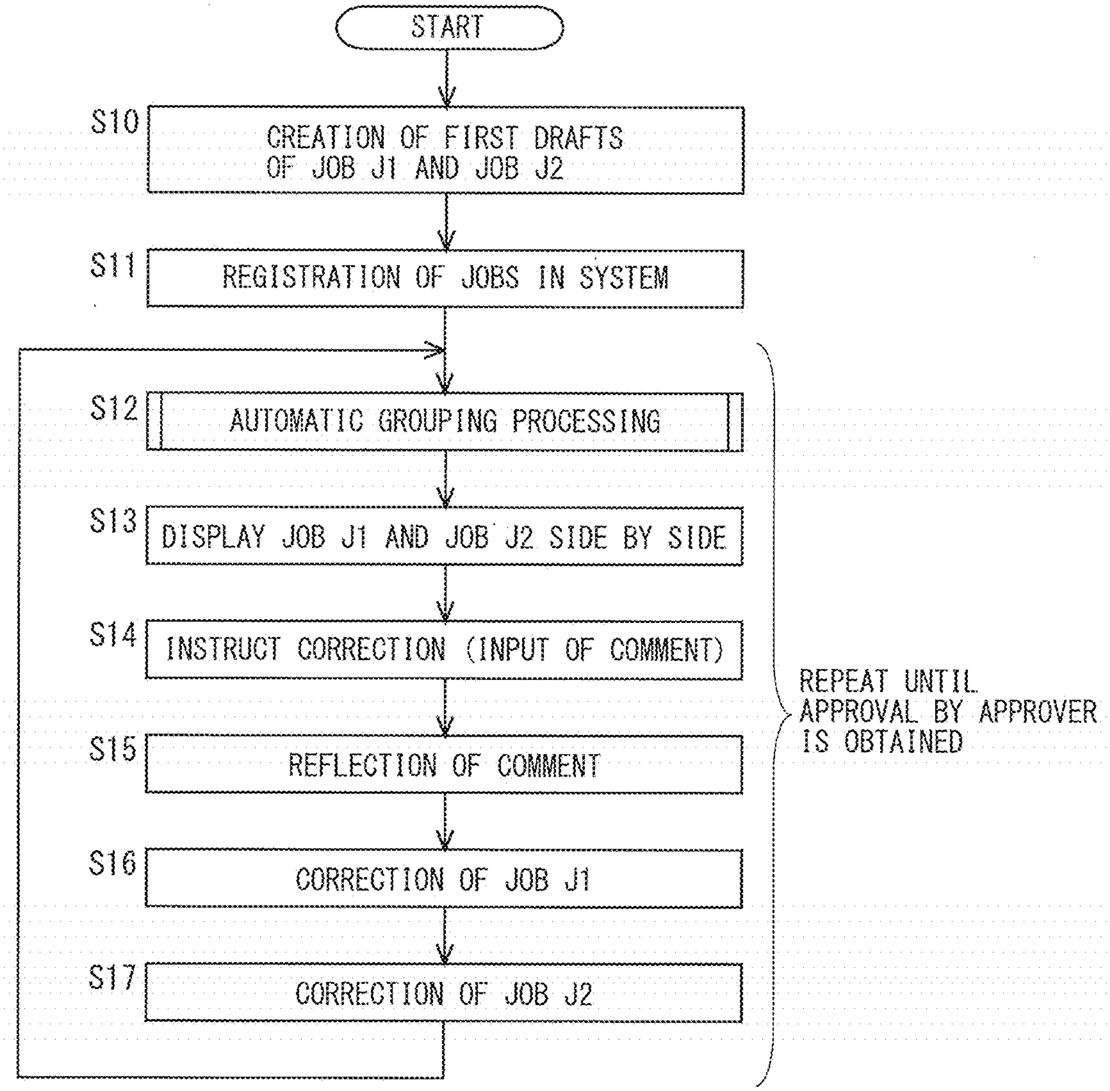
FIG. 4 is a flowchart illustrating a schematic procedure of proofreading work in the embodiment.

A procedure of the proofreading work in the present embodiment will be described with reference to FIG. 4. Here, attention is also focused on a case where an order for printing based on two print jobs (job J1 and job J2) is placed from a customer company to a printing company, and the same correction instruction is given for the two print jobs in the proofreading work.

When an order for printing is placed from a customer company to a printing company, a manuscript based on details of the order is created in a predetermined production company. Here, the first drafts of the job J1 and the job J2 are created on the personal computer 30 in the production company (step S10). Note that data (submitted data) of the created manuscript is transmitted from the personal computer 30 to the online proofreading server 12 via the Internet 42.

Next, in the printing company, the print job registration unit 61 registers the job J1 and the job J2 in the online proofreading system on the basis of the submitted data (step S11). Here, it is assumed that the job J1 is registered as a master job and the job J2 is registered as a general job.

Next, in the online proofreading server 12 in the printing company, automatic grouping processing to be described in detail later is performed (step S12). In this example, the job J1 and the job J2 are grouped as a related job group by the automatic grouping processing. Note that the RIP processing on the submitted data of the job J1 and the job J2 is performed in the automatic grouping processing. A proofreading image is created by the RIP processing.

Next, the proofreading image corresponding to the job J1 and the proofreading image corresponding to the job J2 are displayed side by side on the display unit of the personal computer 20 in the customer company (step S13). In a state where the two print jobs are displayed side by side in this manner, work of confirming the details of the proofreading images and instructing correction is performed by a correction instructor (person in charge of proofreading in the customer company) (step S14). In step S14, specifically, the correction instructor inputs a common comment to the common image area (image portion common between the proofreading image corresponding to the job J1 and the proofreading image corresponding to the job J2) of the proofreading image corresponding to one print job. Thereafter, the common comment inputted in step S14 is reflected in the proofreading image corresponding to the other print job (step S15). Since such an operation is performed, in a case where it is necessary to give the same correction instruction for the job J1 and the job J2, the correction instructor may give the correction instruction only for one print job.

Thereafter, in the production company, in accordance with the correction instruction in step S14, a correction operator corrects the manuscript of the job J1 (step S16) and corrects the manuscript of the job J2 (step S17) on the personal computer 30 in the production company. Then, the processing of steps S12 to S17 is repeated until approval by an approver of the customer company is obtained. Note that, page association is performed among a plurality of print jobs by the automatic grouping processing as will be described later, and thus the approver of the customer company can utilize the digital plate inspection for the approval work.

Note that, in the present embodiment, a print job registration step is realized by the above-described step S11, a multiple-image display step is realized by the above-described step S13, a comment input step is realized by the above-described step S14, and a comment reflection step is realized by the above-described step S15.

5. Automatic Grouping Processing

Figure 5:
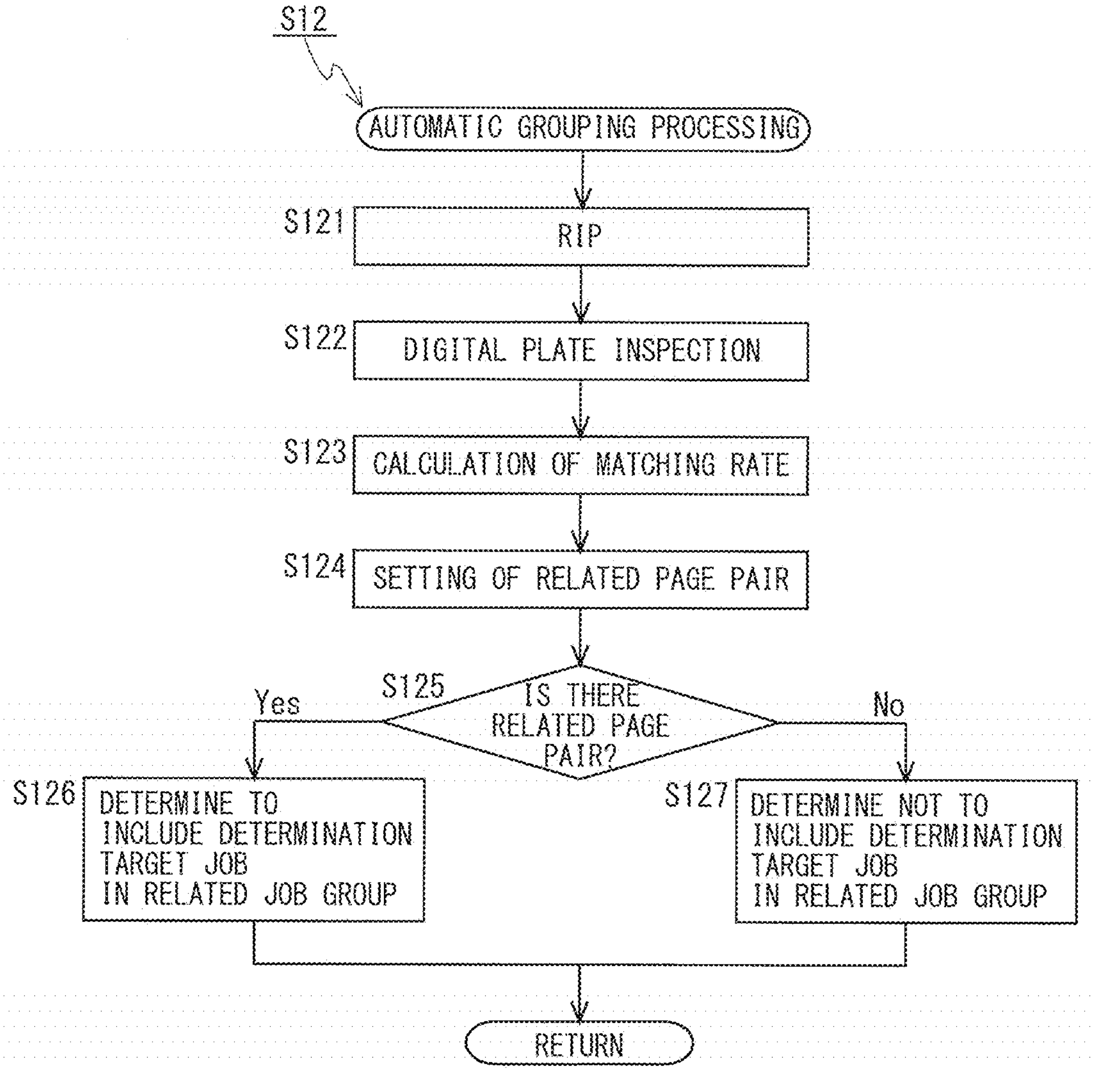
FIG. 5 is a flowchart illustrating a procedure of automatic grouping processing in the embodiment.

The procedure of the automatic grouping processing will be described with reference to the flowchart illustrated in FIG. 5. This automatic grouping processing is started, for example, by selecting a menu for instructing execution of the automatic grouping processing by the operator in the online proofreading server 12. Meanwhile, this automatic grouping processing is repeated as many times as the number of general jobs to be compared with the master job. That is, the processing after step S121 described below is performed for each general job. Therefore, hereinafter, attention is paid to processing for one general job (determination target job) to be compared with the master job. Note that, here, it is assumed that the related job group determination unit 6332 determines to include the determination target job in the related job group when at least one page of the determination target job is defined as a related page pair (see the above-described first example).

After the automatic grouping processing is started, first, the RIP processing unit 631 performs the RIP processing on the image data corresponding to the master job and the image data corresponding to the determination target job (step S121). However, in a case where this automatic grouping processing is repeated twice or more, the RIP processing on the image data corresponding to the master job may be executed only once.

Next, the image data comparison unit 632 performs digital plate inspection of comparing the proofreading image corresponding to the determination target job with the proofreading image corresponding to the master job using the image data after the RIP processing (step S122). Then, from a result obtained in step S122, a matching rate between the determination target job and the master job and the above-described common image area are obtained (step S123). Note that the matching rate is calculated for each combination of the proofreading image corresponding to one page of the determination target job and the proofreading image corresponding to one page of the master job. Furthermore, regarding the digital plate inspection, the detection sensitivity may be adjusted in advance so that a difference due to character filling or fine adjustment of the image layout is not detected.

Next, the related page pair setting unit 6331 performs processing of setting a related page pair on the basis of the matching rate calculated in step S123 (step S124). Thereafter, the related job group determination unit 6332 determines whether or not there is a related page pair (step S125). Meanwhile, in step S124, two pages (one page of the determination target job and one page of the master job) constituting a combination for which a matching rate greater than or equal to a predetermined threshold among a plurality of the matching rates calculated in step S123 is obtained are defined as a related page pair. Therefore, in step S125, when there is at least one matching rate greater than or equal to the threshold among the plurality of matching rates calculated in step S123, it is determined that there is a related page pair. As a result of the determination in step S125, when there is a related page pair, the processing proceeds to step S126, and when there is no related page pair, the processing proceeds to step S127.

In step S126, the related job group determination unit 6332 determines to include the determination target job in the related job group whose main is the master job. In step S127, the related job group determination unit 6332 determines not to include the determination target job in the related job group whose main is the master job. When the processing of step S126 or step S127 ends, the automatic grouping processing ends.

Figures 6, 7:
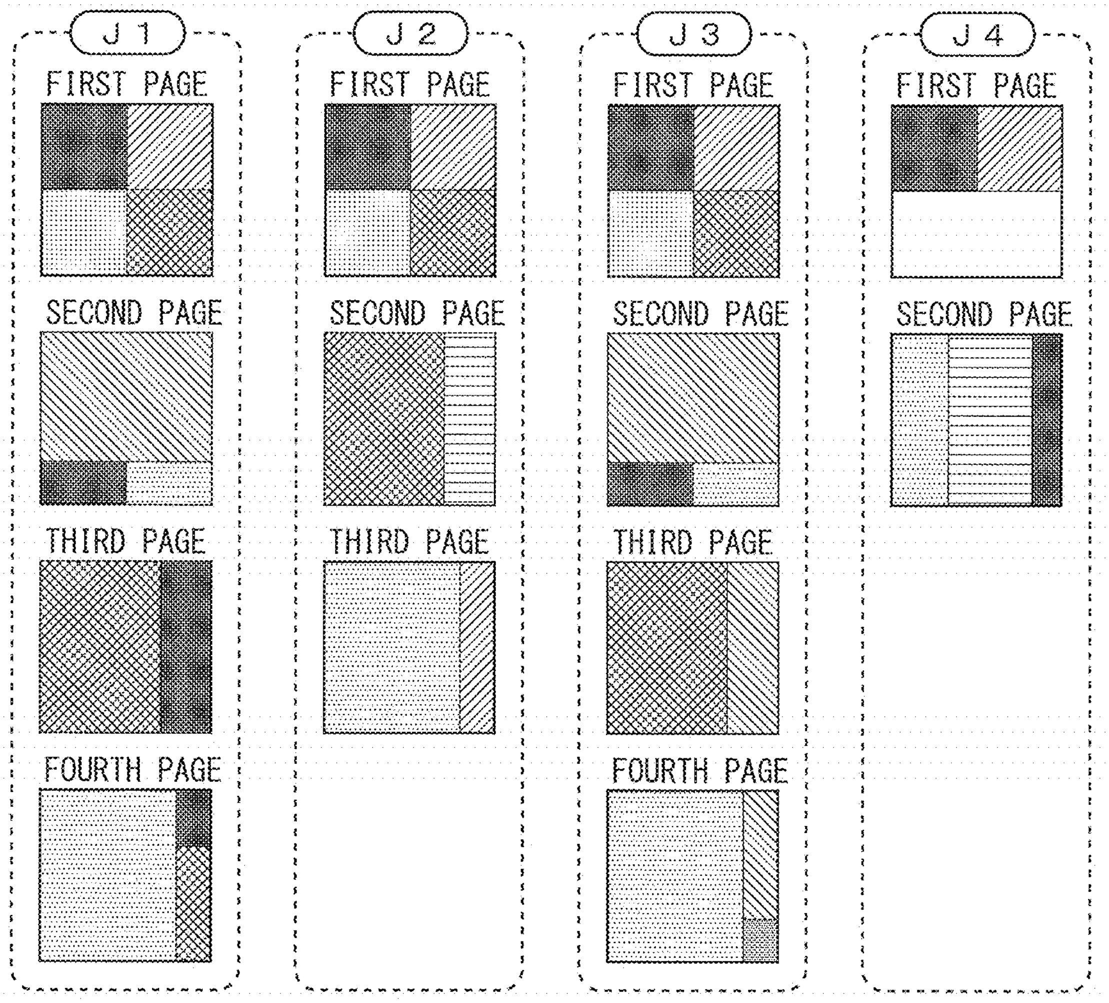
FIG. 6 is a diagram for explaining the automatic grouping processing in the embodiment.
FIG. 7 is a diagram for explaining a related page pair in the embodiment.

Here, attention is focused on a case where four print jobs (jobs J1 to J4) corresponding to images as schematically illustrated in FIG. 6 are registered by the print job registration unit 61. Note that it is assumed that the job J1 is registered as a master job, and the jobs J2 to J4 are registered as general jobs. Furthermore, it is assumed that the threshold to be compared with the matching rate calculated in step S123 is set to 0.8.

Based on a result of comparison between a proofreading image corresponding to the general job J2 and a proofreading image corresponding to the master job J1, for example, the first page of the general job J2 and the first page of the master job J1 are defined as a related page pair, and the third page of the general job J2 and the fourth page of the master job J1 are defined as a related page pair. Furthermore, based on a result of comparison between a proofreading image corresponding to the general job J3 and a proofreading image corresponding to the master job J1, for example, the first page of the general job J3 and the first page of the master job J1 are defined as a related page pair, the second page of the general job J3 and the second page of the master job J1 are defined as a related page pair, and the fourth page of the general job J3 and the fourth page of the master job J1 are defined as a related page pair. For the general job J4, there is no page constituting a related page pair with the master job J1.

Thus, the pages of the jobs J1 to J3 are associated with each other as illustrated in FIG. 7. For example, a row indicated by an arrow denoted by reference character 69 in FIG. 7 indicates that the fourth page of the master job J1, the third page of the general job J2, and the fourth page of the general job J3 are associated with each other. Since the pages are associated among the plurality of print jobs in this manner, the approver of the customer company can utilize the digital plate inspection for the approval work.

In the above case, first, a related job group including the master job J1 and the general job J2 (a related job group whose main is the master job J1) is generated as illustrated in FIG. 8 based on a result of comparison between the proofreading image corresponding to the general job J2 and the proofreading image corresponding to the master job J1. Then, based on a result of comparison between the proofreading image corresponding to the general job J3 and the proofreading image corresponding to the master job J1, as illustrated in FIG. 9, the general job J3 is added to the related job group whose main is the master job J1.

Note that, in the present embodiment, an image data comparison step is realized by steps S122 and S123, and a grouping step is realized by steps S124 to S127. Furthermore, a related page pair setting step is realized by step S124, and a related job group determination step is realized by steps S125 to S127.

6. Specific Example of Operation

Figure 10:
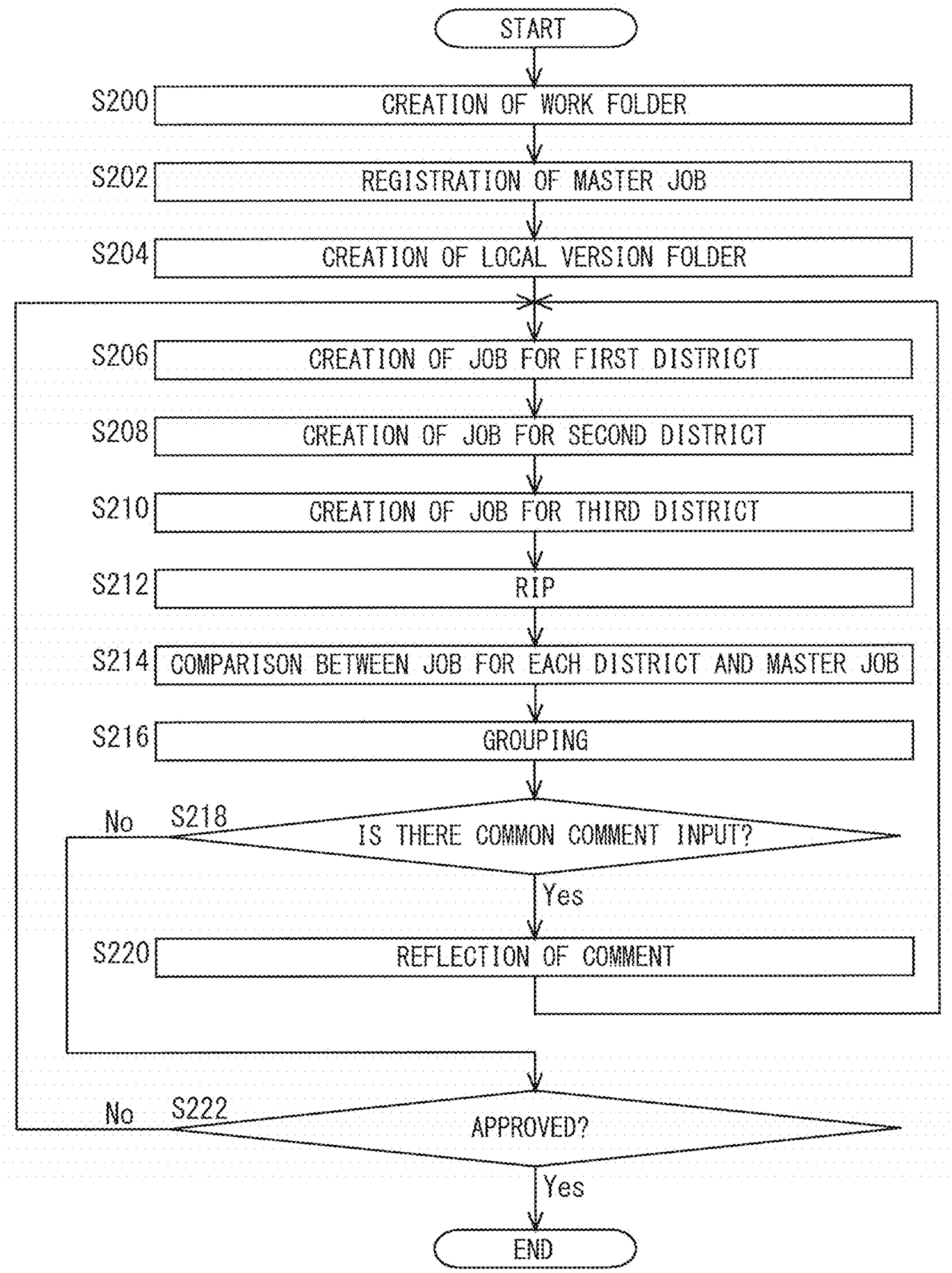
FIG. 10 is a flowchart for explaining a specific example regarding operation in the embodiment.

Next, a specific example regarding operation will be described with reference to the flowchart illustrated in FIG. 10. Here, proofreading work of a flier for a chain supermarket is taken as an example. Furthermore, it is assumed that the name of the focused supermarket is "ABC supermarket", and attention is paid to the creation of the February issue of the flier in a situation where the January issue of the flier exists. Here, it is assumed that the related job group determination unit 6332 determines to include the determination target job in the related job group when all the pages of the determination target job are defined as a related page pair (see the above-described second example). Note that, in the following description, job data to be processed at the time of the first proof (first proofreading work) is referred to as "first proof job data", and job data to be processed at the time of the second proof (second proofreading work) is referred to as "second proof job data".

Figure 11:
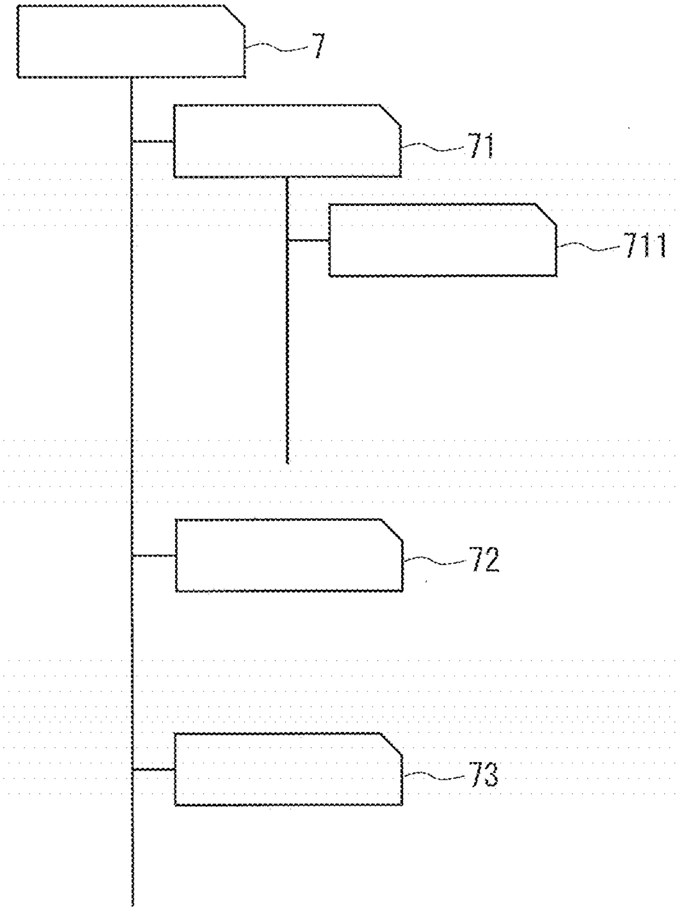
FIG. 11 is a diagram schematically illustrating a state of a job data storage unit before creation of a February issue of a flier is started in the embodiment.

FIG. 11 is a diagram schematically illustrating a state of the job data storage unit 62 (see FIG. 3) before the creation of the February issue of the flier is started. A work folder for each customer company is provided below a root folder 7. FIG. 11 illustrates an ABC supermarket work folder 71 and work folders 72 and 73 for other customer companies. A January issue creation folder 711 already exists below the ABC supermarket work folder 71.

Figure 12:
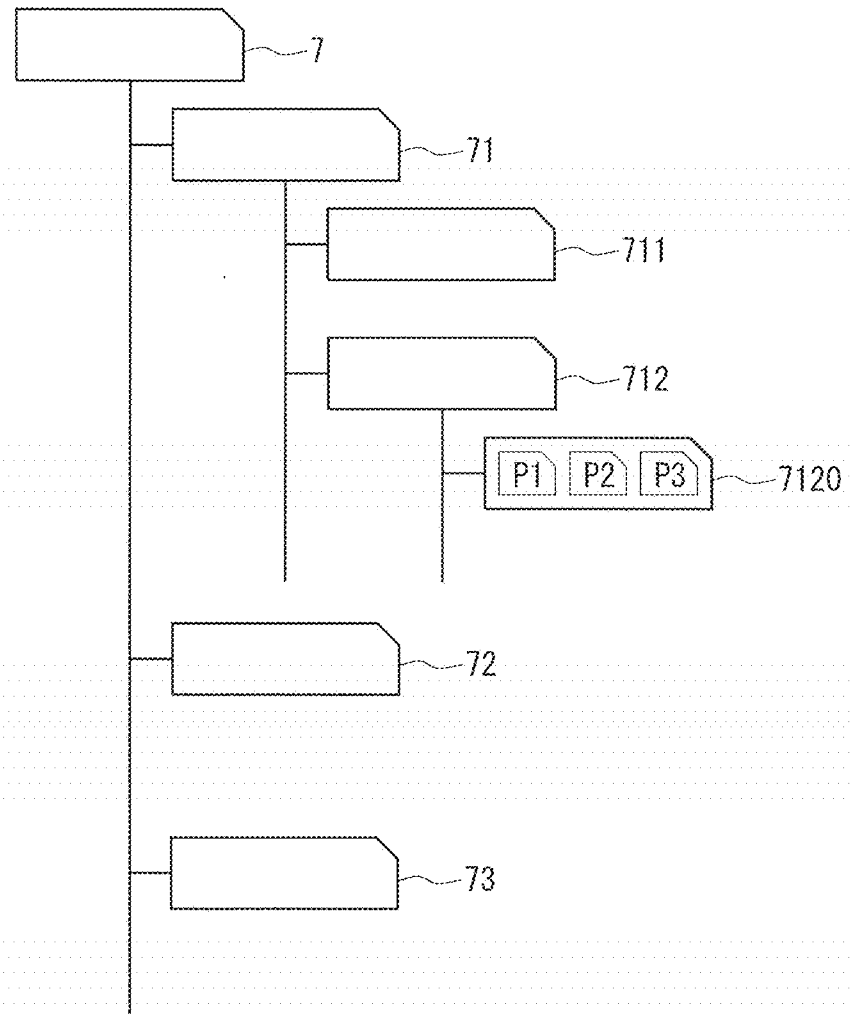
FIG. 12 is a diagram schematically illustrating a state of the job data storage unit after job data of a master job is created in the embodiment.

Under the above circumstances, a February issue creation folder 712 (see FIG. 12), which is a work folder for creating the February issue of the flier, is created below the ABC supermarket work folder 71 (step S200). Next, the master job is registered (step S202). Specifically, job data 7120 of the master job created by the personal computer 30 in the production company is stored in the February issue creation folder 712. The job data 7120 of the master job is data serving as a basis of creation of a local version flier to be described later, and includes three pages (P1 to P3) in this example. Note that the administrator authority is set so that only the operator who creates the master job, the approver who approves the master job, and the operator who creates a local version folder to be described later can access immediately below the February issue creation folder 712.

Figure 13:
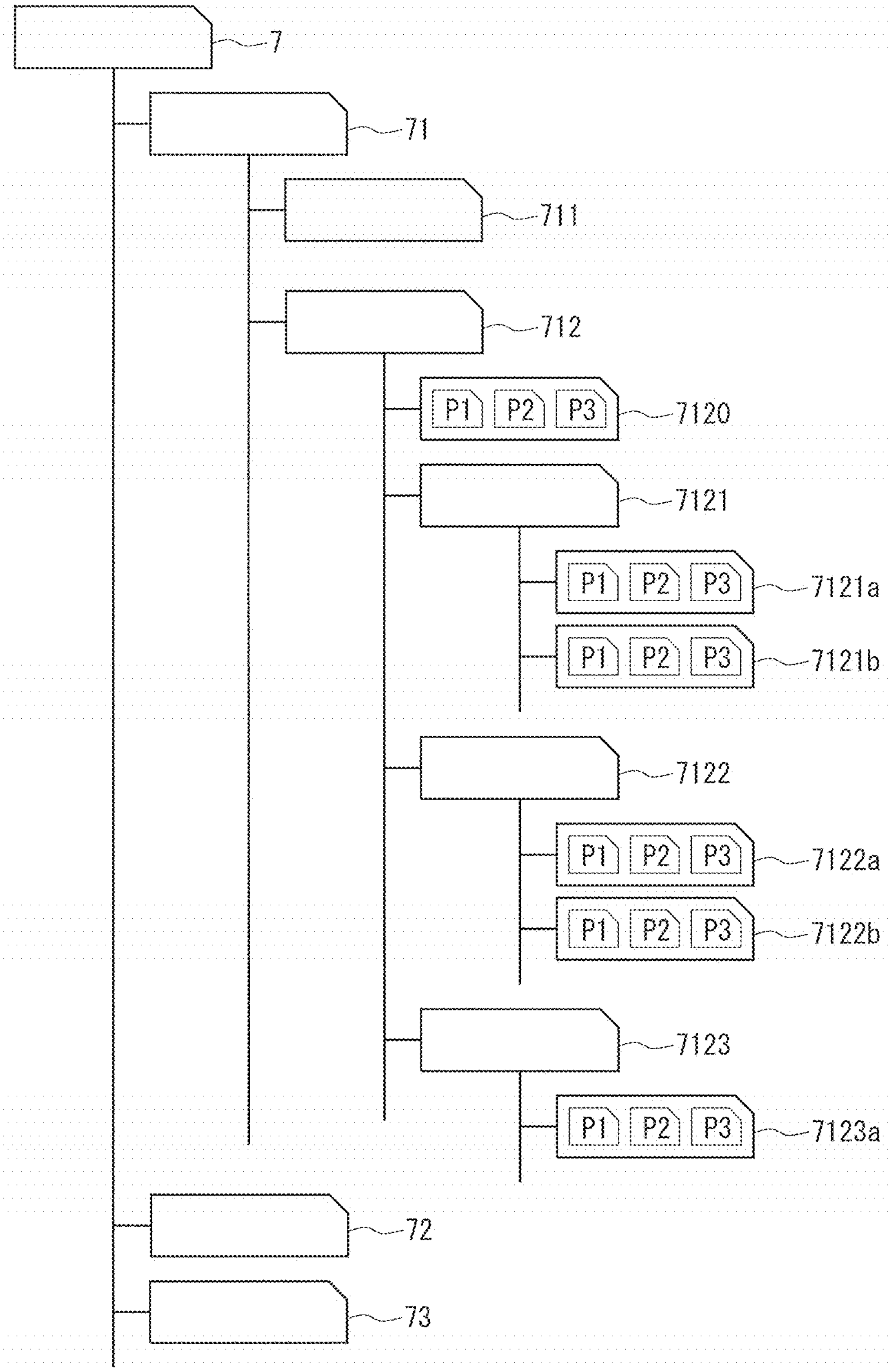
FIG. 13 is a diagram schematically illustrating a state of the job data storage unit after job data of a second proof is created in the embodiment.

After the master job is registered, work of creating a local version flier is started. Specifically, first, a local version folder, which is a folder used to create a local version flier, is created below the February issue creation folder 712 (step S204). Note that, here, a case of creating three local version fliers of "first district", "second district", and "third district" is focused on. In this case, as illustrated in FIG. 13, a first district work folder 7121, a second district work folder 7122, and a third district work folder 7123 are created as local version folders below the February issue creation folder 712. The administrator authority is set so that only the operator who creates the print job for the corresponding district and the approver who approves the corresponding print job can access each of the district work folders.

Next, the operator in the first district creates a print job (manuscript of the flier) for the first district based on the master job (step S206). The first proof job data 7121*a* for the first district created in step S206 is stored in the first district work folder 7121. Similarly, a print job for the second district is created (step S208), and a print job for the third district is further created (step S210). The first proof job data 7122*a* for the second district created in step S208 is stored in the second district work folder 7122, and the first proof job data 7123*a* for the third district created in step S210 is stored in the third district work folder 7123. In this example, the first proof job data 7121*a* for the first district, the first proof job data 7122*a* for the second district, and the first proof job data 7123*a* for the third district are all configured by three pages (P1 to P3). Note that the order of the processing of step S206, step S208, and step S210 is not particularly limited, and these processing may be performed simultaneously in parallel.

After the first proof job data for the first to third districts are created, automatic grouping processing is performed (steps S212 to S216). In this regard, first, the RIP processing is performed (step S212). In this case, the RIP processing is performed on image data included in the job data 7120 of the master job, image data included in the first proof job data 7121*a* for the first district, image data included in the first proof job data 7122*a* for the second district, and image data included in the first proof job data 7123*a* for the third district.

Next, the first proof job data 7121*a* to 7123*a* for each district is compared with the job data 7120 of the master job (step S214). More specifically, the image data included in the first proof job data 7121*a* for the first district and the image data included in the job data 7120 of the master job are compared, the image data included in the first proof job data 7122*a* for the second district and the image data included in the job data 7120 of the master job are compared, and the image data included in the first proof job data 7123*a* for the third district and the image data included in the job data 7120 of the master job are compared.

Then, based on a comparison result obtained in step S214, the master job and the print job for each district highly related to the master job are grouped as a related job group whose main is the master job (step S216). Here, it is assumed that the first to the third pages of the first proof job data 7121*a* for the first district substantially coincide with the first to the third pages of the job data 7120 of the master job, respectively (that is, the matching rate is greater than or equal to the threshold). In this case, the print job corresponding to the first proof job data 7121*a* for the first district is included in the related job group whose main is the master job. Furthermore, it is also assumed that the first to the third pages of the first proof job data 7122*a* for the second district substantially coincide with the first to the third pages of the job data 7120 of the master job, respectively. In this case, the print job corresponding to the first proof job data 7122*a* for the second district is included in the related job group whose main is the master job. Furthermore, it is also assumed that the first to the second pages of the first proof job data 7123*a* for the third district substantially coincide with the first to the second pages of job data 7120 of the master job, respectively, but the third page of the first proof job data 7123*a* for the third district hardly coincides with the third page of the job data 7120 of the master job (that is, the matching rate is less than the threshold). In this case, the print job corresponding to the first proof job data 7123*a* for the third district is not included in the related job group whose main is the master job.

Thereafter, the proofreading screen is displayed on the display unit of the personal computer used by the operator in each district. Then, it is determined whether or not the common comment has been inputted to the common image area of the proofreading image displayed on the proofreading screen (step S218). As a result, when the common comment has been inputted, the processing proceeds to step S220, and when the common comment has not been inputted, the processing proceeds to step S222.

In step S220, the common comment inputted to the common image area of the proofreading image corresponding to one of the plurality of print jobs constituting a related job group is reflected in the common image area of the proofreading image corresponding to another print job constituting the related job group. For example, when the common comment is inputted to the common image area of the proofreading image corresponding to the master job, the common comment is reflected in the common image area of the proofreading image corresponding to the print job for the first district and the common image area of the proofreading image corresponding to the print job for the second district. After step S220 ends, the processing returns to step S206.

In step S222, it is determined whether or not approval by the approver has been obtained for the print job for each district. As a result, when the approval by the approver has been obtained for the print jobs for all the districts, the processing ends, and when the approval by the approver has not been obtained for the print job for at least one district, the processing returns to step S206. In this manner, steps S206 to S222 are repeated until the approval by the approver is obtained for the print jobs for all the districts. Note that, in the second and subsequent loops of this processing, the print job is re-created only for the district for which the approval by the approver has not been obtained. In the example illustrated in FIG. 13, second proof job data 7121*b* for the first district is stored in the first district work folder 7121, and second proof job data 7122*b* for the second district is stored in the second district work folder 7122.

Meanwhile, in the above example, grouping processing is performed between the master job whose job data is stored in the February issue creation folder 712 and the print job for each district whose job data is stored in the February issue creation folder 712. That is, the grouping processing is performed between the print jobs whose job data is stored in the February issue creation folder 712. However, the present invention is not limited thereto, and for example, the grouping processing may be performed between the master job whose job data is stored in the February issue creation folder 712 and the print job for each district whose job data is stored in the January issue creation folder 711.

7. Correction Instruction Work

Next, the correction instruction work performed on the personal computer 20 in the customer company will be described in detail. Here, attention is paid to a case where the correction instruction work is performed while displaying the proofreading image corresponding to the master job and the proofreading image corresponding to one general job side by side. Note that it is assumed that the master job J1 and the general job J2 constitute a related job group.

Figure 14:
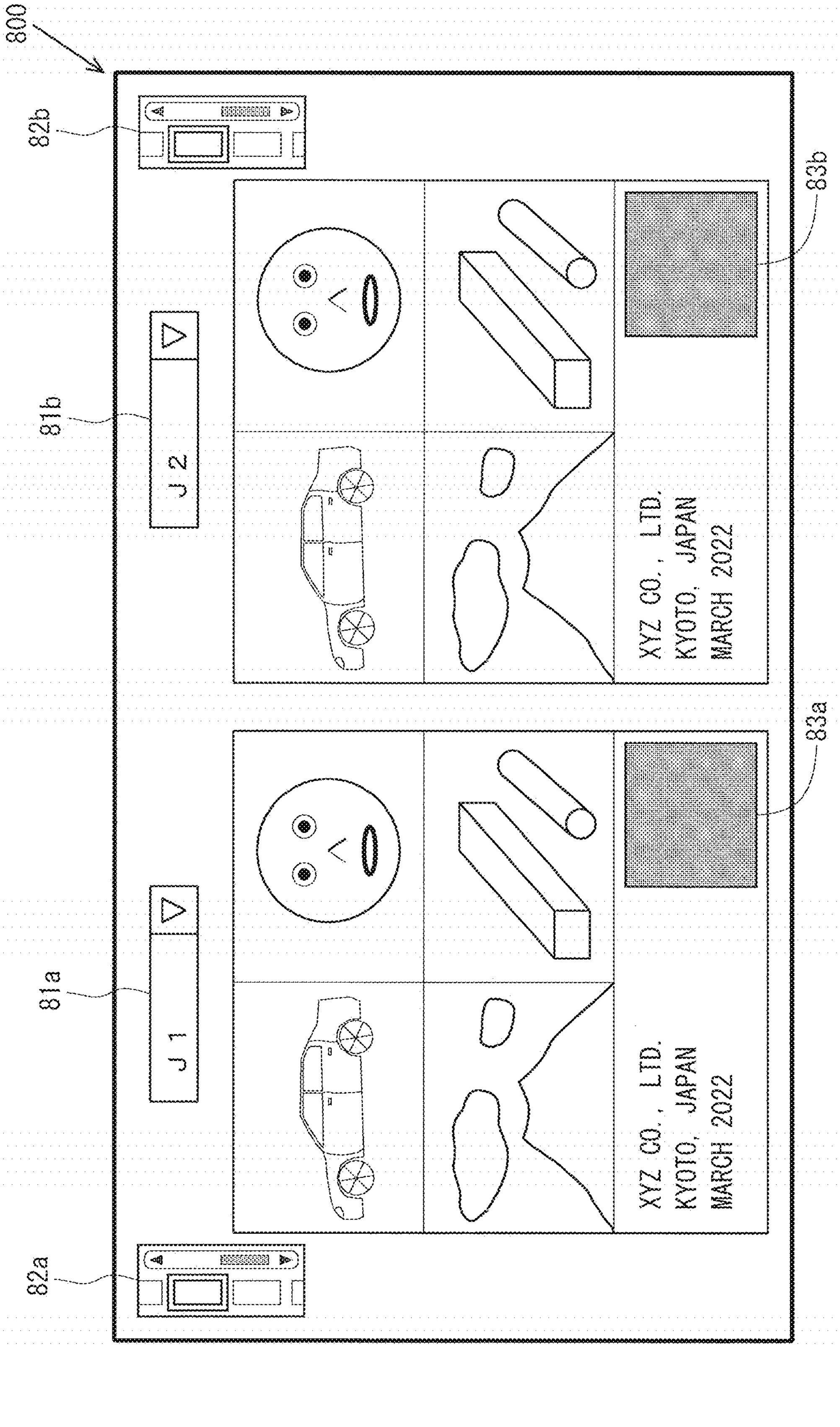
FIG. 14 is a diagram illustrating an example of a proofreading screen displayed when correction instruction work is performed in the embodiment.

In the present embodiment, when the correction instruction work is performed, a proofreading screen 800 as illustrated in FIG. 14 is displayed on the display unit of the personal computer 20 in the customer company. Note that, in FIG. 14, menu buttons and the like that has no direct relationship with the present invention are omitted. The proofreading screen 800 is provided with two drop-down lists 81*a* and 81*b*. The drop-down lists 81*a* and 81*b* enable selection of a print job to be displayed in the proofreading screen 800. The proofreading image corresponding to the print job selected by the drop-down list 81*a* is displayed on the left side in the proofreading screen 800, and the proofreading image corresponding to the print job selected by the drop-down list 81*b* is displayed on the right side in the proofreading screen 800. In the example illustrated in FIG. 14, the proofreading image corresponding to the master job J1 is displayed on the left side in the proofreading screen 800, and the proofreading image corresponding to the general job J2 is displayed on the right side in the proofreading screen 800.

The proofreading screen 800 is also provided with two page thumbnail display areas 82*a* and 82*b*. On the left side of the proofreading screen 800, a proofreading image of a page selected in the page thumbnail display area 82*a* among one or more pages constituting the print job selected by the drop-down list 81*a* is displayed. On the right side of the proofreading screen 800, a proofreading image of a page selected in the page thumbnail display area 82*b* among the one or more pages constituting the print job selected by the drop-down list 81*b* is displayed. Here, when the display page for the proofreading image corresponding to one print job is changed to another page by the operator, in conjunction with the change, the display page for the proofreading image corresponding to the other print job is automatically changed. Specifically, when the display page for the proofreading image corresponding to one print job is changed to one of the two pages constituting the related page pair by the operator, the display page for the proofreading image corresponding to the other print job is automatically changed to the other of the two pages constituting the related page pair.

On the proofreading screen 800, regarding an area having a large difference between the proofreading image corresponding to the master job J1 and the proofreading image corresponding to the general job J2, that is, an area other than the common image area (hereinafter, the area is referred to as a "different image area"), mask display that displays an image of a specific pattern without displaying the proofreading image based on the image data is performed, as indicated by portions denoted by reference characters 83*a* and 83*b* in FIG. 14. Note that the different image area may be highlighted instead of the mask display. Furthermore, the mask display and the highlight display may be switched by an operation of the operator.

The correction instruction is performed by the operator inputting a comment to the proofreading image. In this regard, in the present embodiment, as described above, the common comment and the normal comment are provided as comments that can be inputted by the correction instructor (operator). Even if a normal comment is inputted to the proofreading image corresponding to one print job, the normal comment is not reflected in the proofreading image corresponding to the other print job. On the other hand, when a common comment is inputted to the proofreading image corresponding to one print job and an area to which the common comment is inputted is the common image area, the common comment is reflected in the proofreading image corresponding to the other print job.

Figure 15:
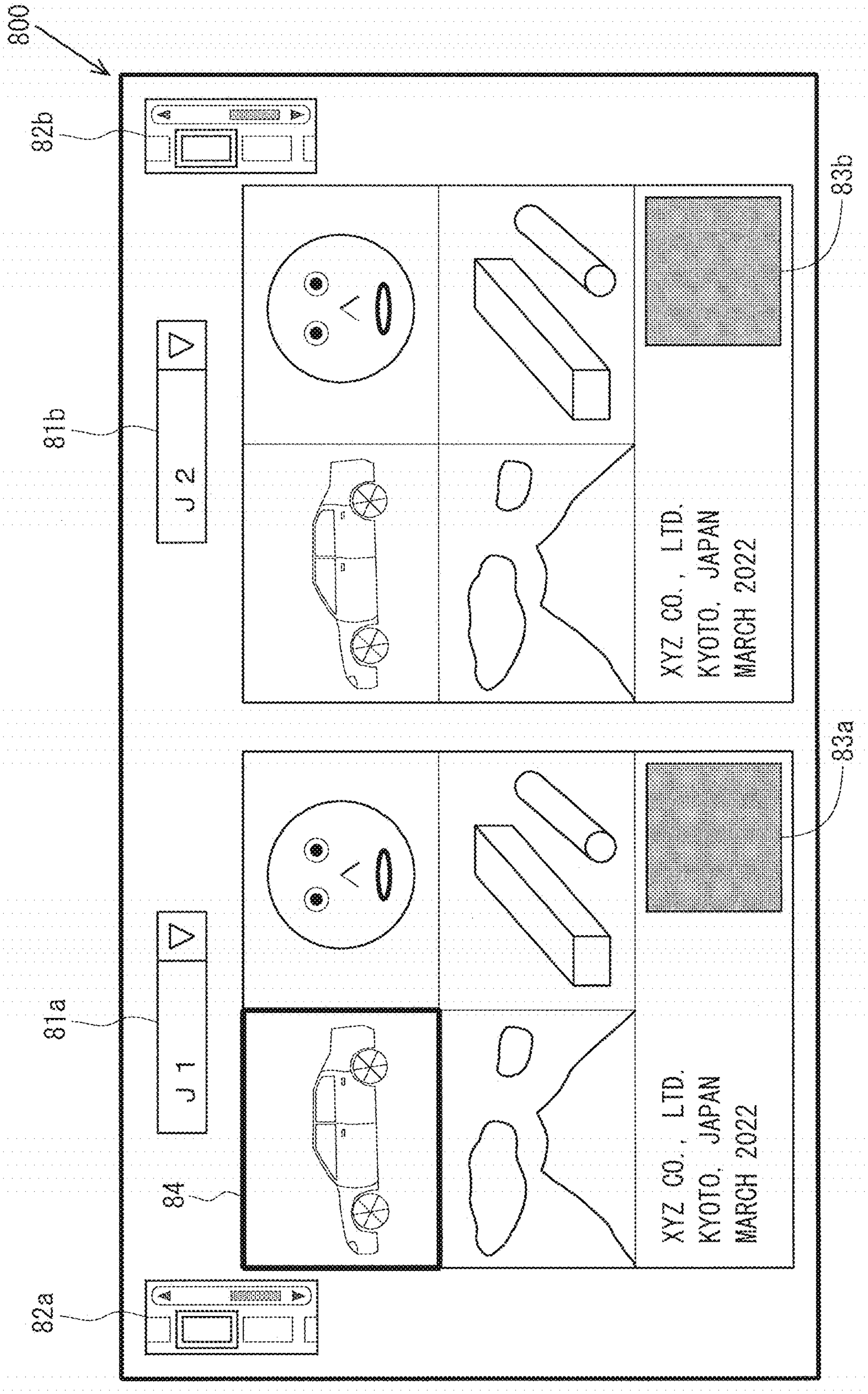
FIG. 15 is a diagram for explaining an operation when a common comment is inputted in the embodiment.
Figure 16:
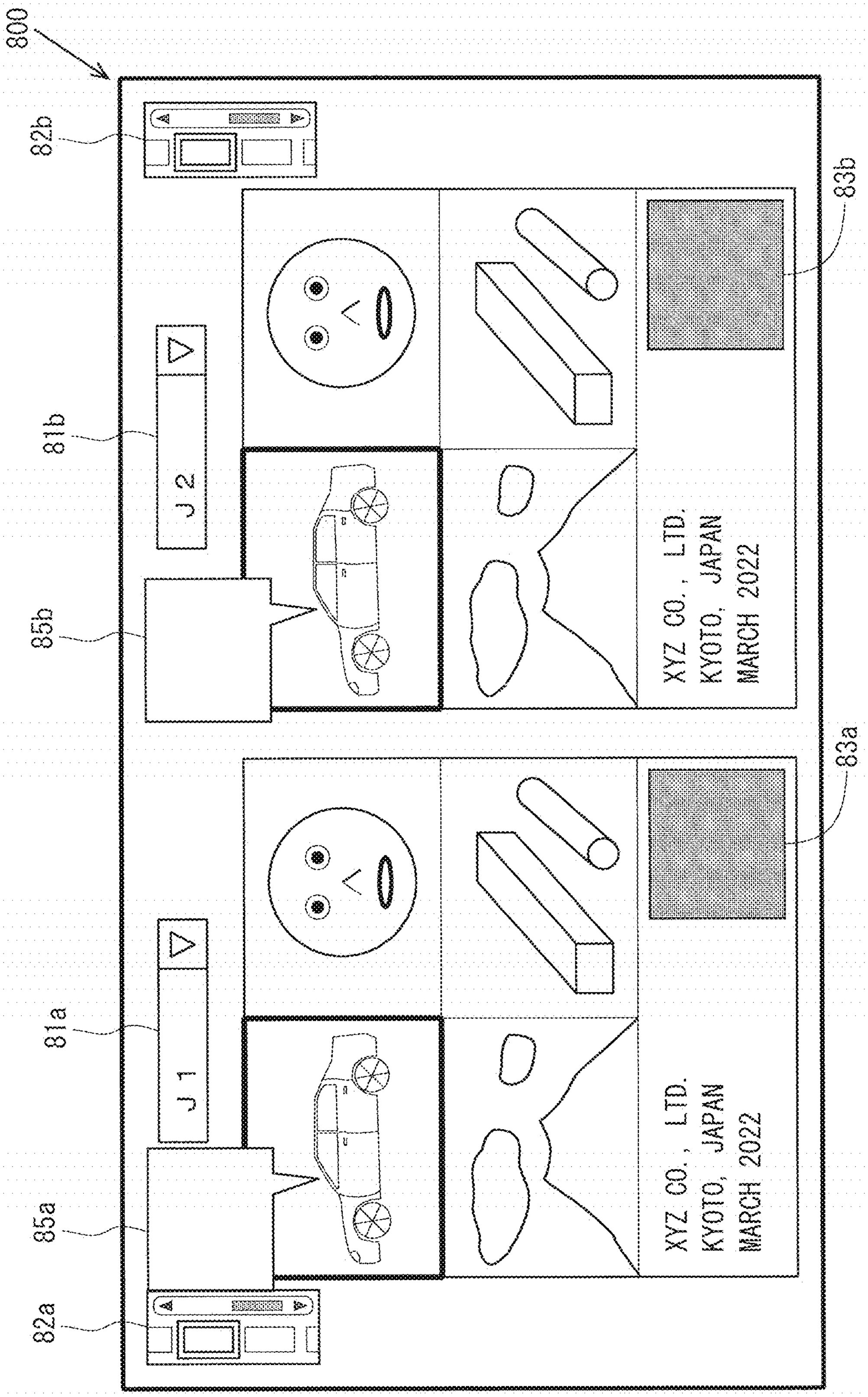
FIG. 16 is a diagram illustrating an example of a proofreading screen on which a blow-out type text box for comment input is displayed in the embodiment.
Figure 17:
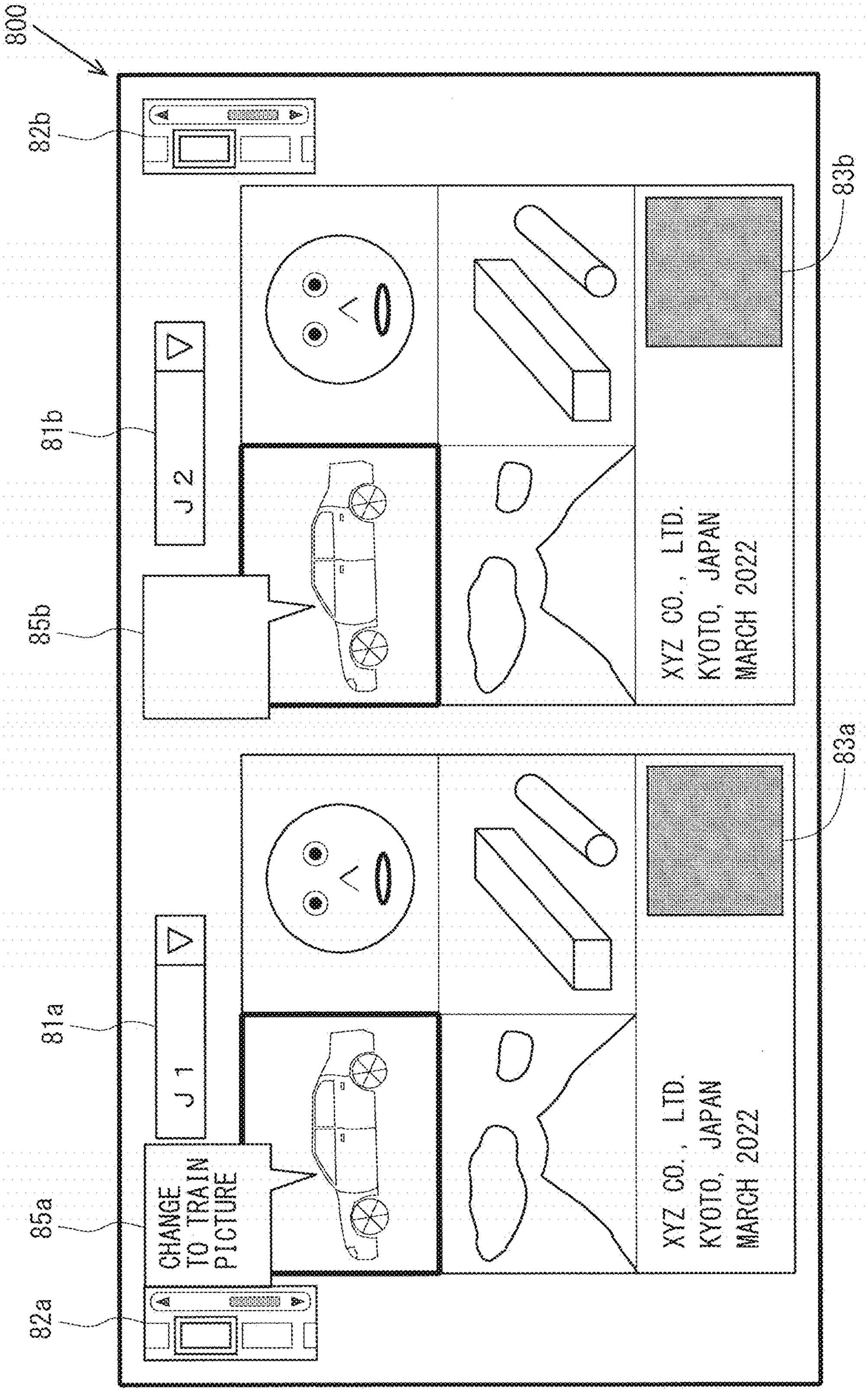
FIG. 17 is a diagram illustrating an example of a proofreading screen immediately after a common comment is inputted in the embodiment.
Figure 18:
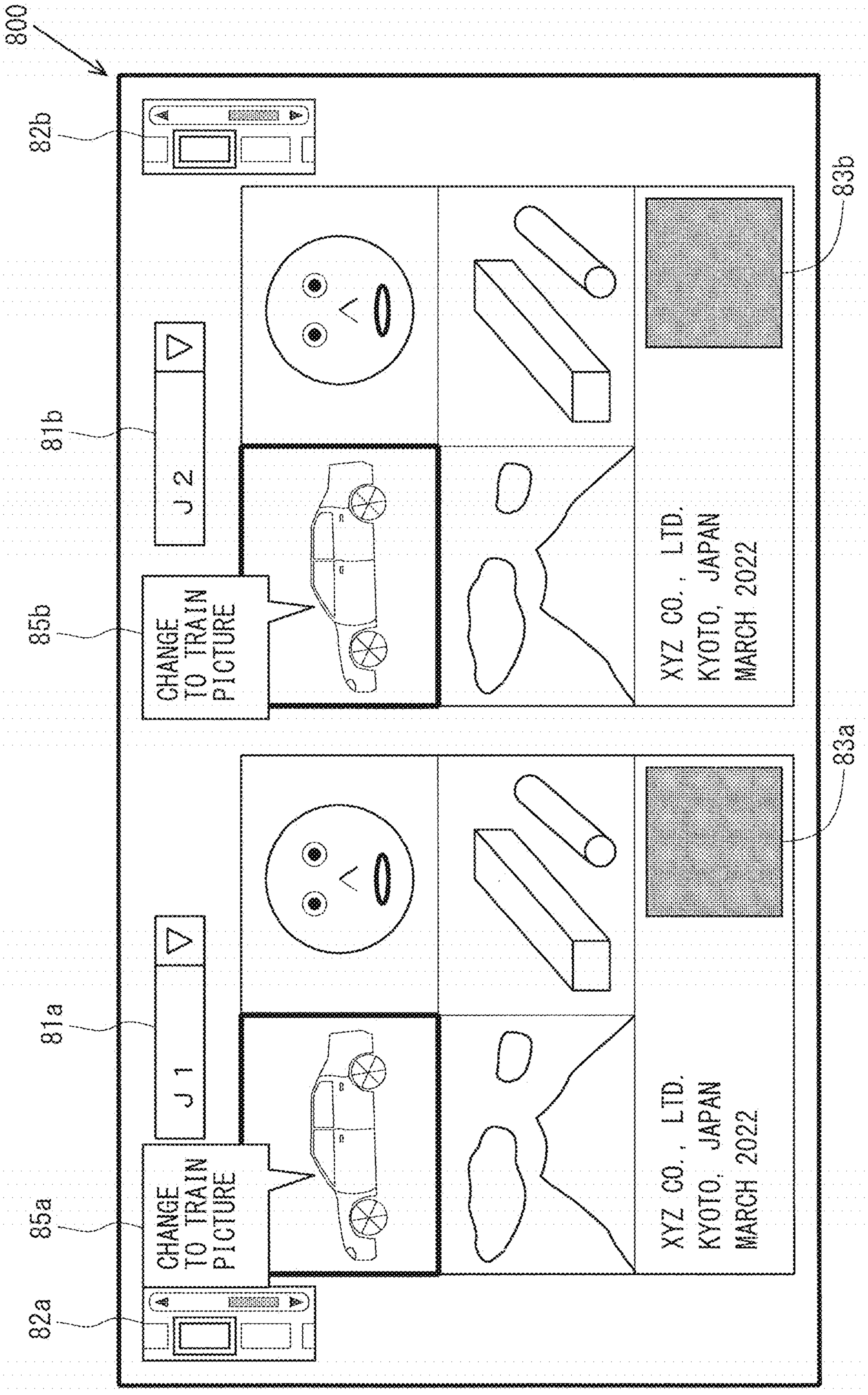
FIG. 18 is a diagram for explaining reflection of a common comment in the embodiment.

Regarding the case illustrated in FIG. 14, it is assumed that a correction instruction to change an automobile picture to a train picture is given for both the master job J1 and the general job J2. In this case, the correction instructor first selects a menu (not illustrated) for a common comment, and then, designates an image portion for the automobile picture by surrounding the image portion with a rectangular frame 84 as illustrated in FIG. 15 (a region surrounded by the rectangular frame 84 is a comment input area). Thereby, as illustrated in FIG. 16, blow-out type text boxes 85*a* and 85*b* for comment input are displayed in the proofreading screen 800. Then, the correction instructor inputs a comment in the text box 85*a*, for example, as illustrated in FIG. 17. Thereby, as illustrated in FIG. 18, the same comment as the comment inputted in the text box 85*a* is automatically displayed in the text box 85*b*. Note that when a comment is inputted in the text box 85*b*, the same comment as the comment is automatically displayed in the text box 85*a*.

Figure 19:
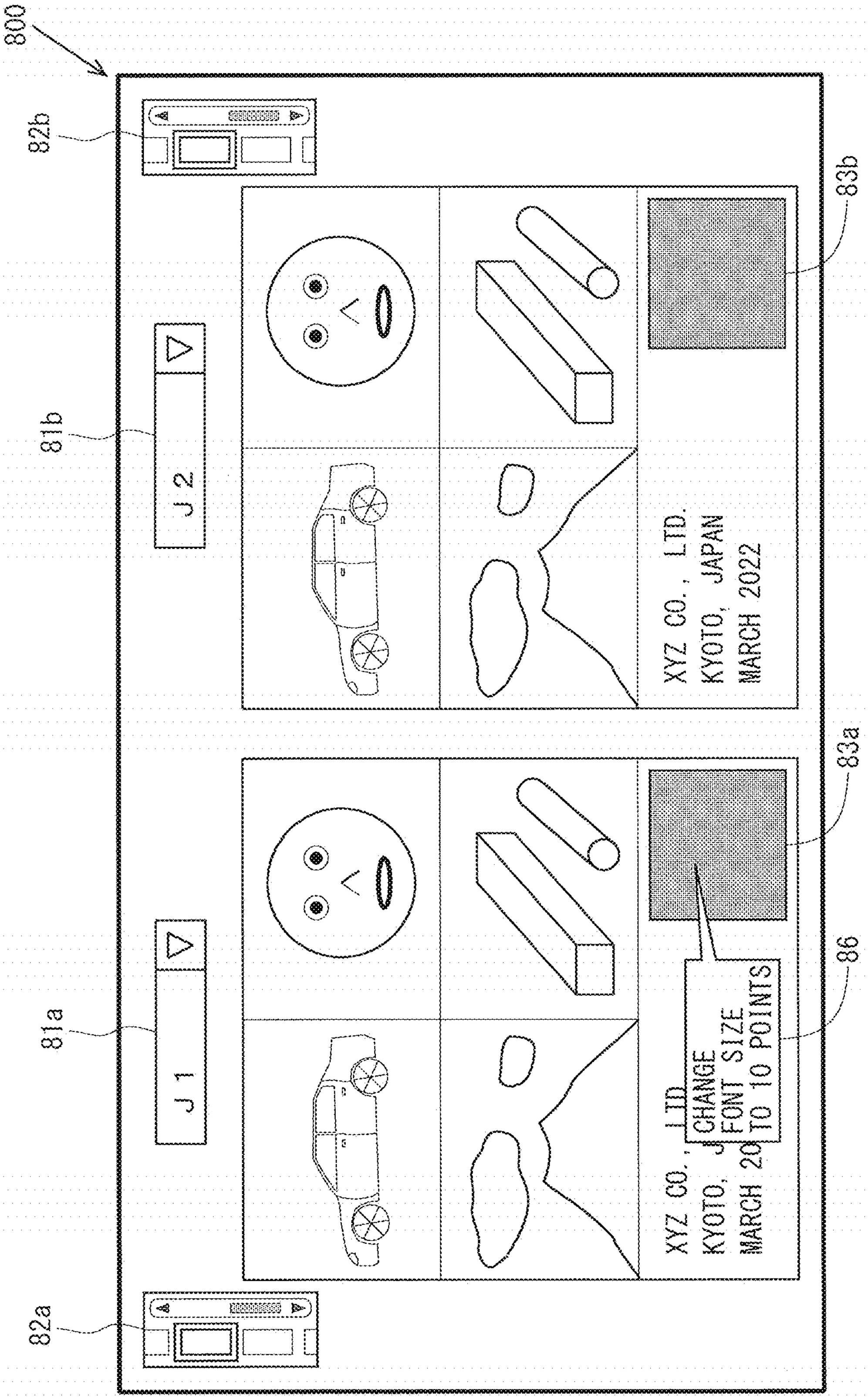
FIG. 19 is a diagram for explaining a case where a common comment is inputted for a different image area in the embodiment.
Figure 20:
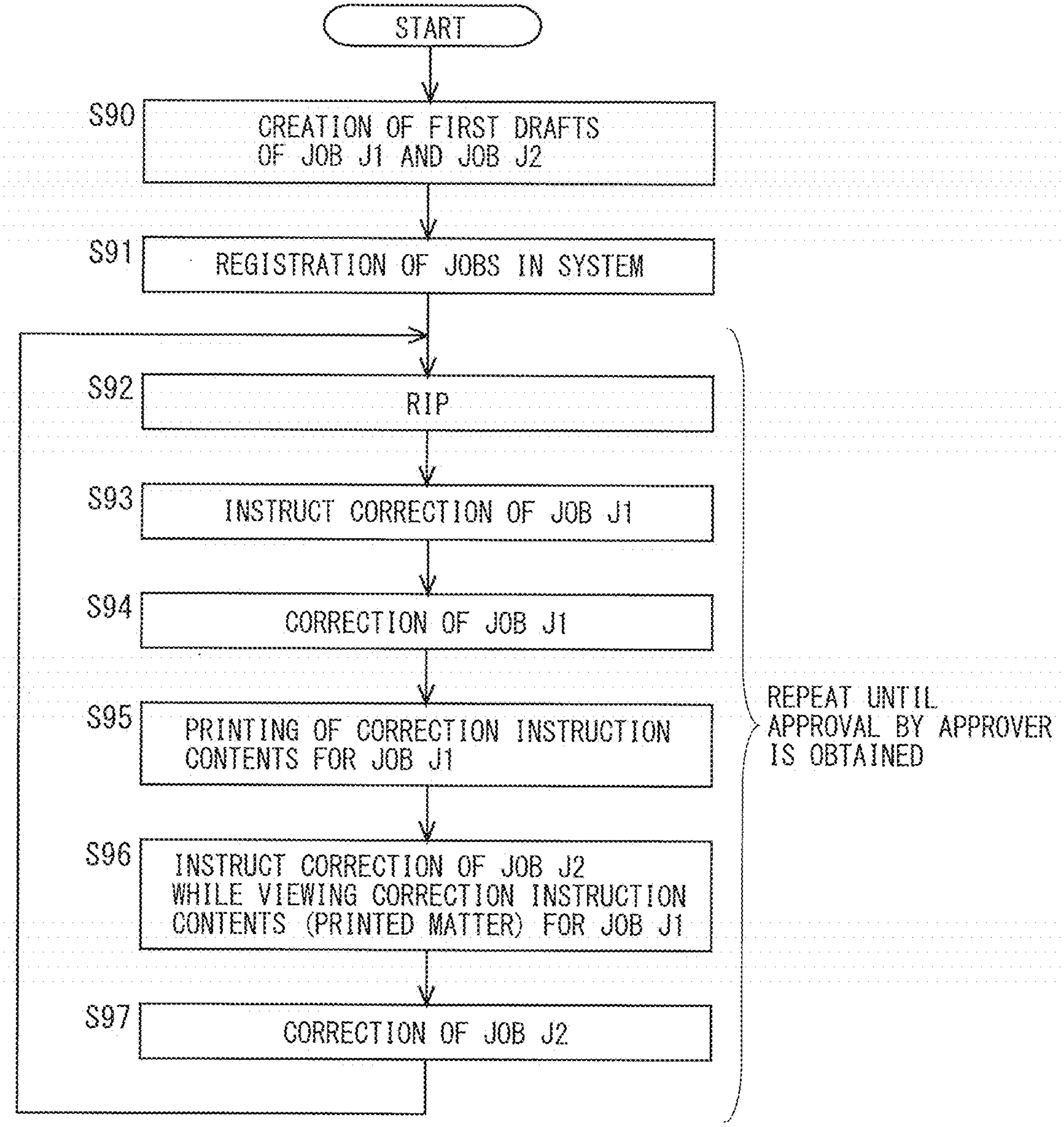
FIG. 20 is a illustrating a schematic procedure of proofreading work in a case where a conventional online proofreading system is adopted.

Meanwhile, when a common comment is inputted to the different image area in the proofreading image corresponding to one print job as illustrated in FIG. 19, the common comment is not reflected in the proofreading image corresponding to the other print job. Note that the configuration may be such that a comment cannot be inputted to the different image area in a case where the menu for the common comment is selected.

Note that, although the case where the two proofreading images corresponding to the two print jobs are displayed in the proofreading screen 800 has been illustrated here, P proofreading images corresponding to P print jobs may be displayed in the proofreading screen 800 with P being an integer of 3 or more. For example, four proofreading images corresponding to four print jobs constituting the related job group may be displayed in the proofreading screen 800. In this case, when a common comment is inputted to the common image area of one of the four proofreading images, the common comment is reflected in the common image areas of the other three proofreading images.

Furthermore, the configuration may be such that the operator can set whether to enable or disable the mask display and the mask display is performed only in a case where the setting to enable the mask display is performed. In this case, for example, a step (mask display setting step) in which the operator sets whether to enable or disable the mask display may be provided before the automatic grouping processing (step S12 in FIG. 4) is started.

8. Effects

According to the present embodiment, by the processing of the computer, image data corresponding to a print job (general job) other than a print job registered as a master job and image data corresponding to the master job are compared, and a set of a plurality of the print jobs that are highly related to each other and include the master job is defined as a related job group. Then, when a correction instructor inputs, in a state where a proofreading image corresponding to a proofreading target job (one of the plurality of print jobs constituting the related job group) is displayed on the display unit of the personal computer 20 in the customer company, a common comment with designating a common image area (an image portion common between a proofreading image corresponding to the general job and a proofreading image corresponding to the master job) in the proofreading image as the comment input area, the computer reflects the common comment on a proofreading image corresponding to a print job other than the proofreading target job among the plurality of print jobs constituting the related job group. Therefore, in a case where it is necessary to give the same correction instruction for a plurality of print jobs highly related to each other, a correction instructor may input a comment of the correction instruction for only one print job. Accordingly, the correction instructor can give the correction instruction to a correction operator more efficiently and reliably than before. As above, according to the present embodiment, the efficiency of the proofreading work and the reduction in errors in the proofreading work in a case where there are a plurality of print jobs related to each other are realized.

9. Others

The present invention is not limited to the above embodiment, and various modifications can be made without departing from the gist of the present invention. For example, although the printing company is provided with two servers (the print workflow management server 11 and the online proofreading server 12) in the above embodiment, the present invention is not limited thereto, and the present invention can also be applied to a case where functions implemented by these two servers are implemented by one server (computer). Furthermore, although the plurality of proofreading images corresponding to the plurality of print jobs are displayed on the proofreading screen in the above embodiment, the present invention is not limited thereto, and the present invention can also be applied to a case where only a proofreading image corresponding to one print job is displayed on the proofreading screen. In this case, when a common comment is inputted to the common image area of the proofreading image displayed on the proofreading screen, the image data is internally corrected such that the common comment is displayed in the common image area of the proofreading image when the proofreading image of another print job constituting the related job group is displayed on the proofreading screen.

DESCRIPTION OF REFERENCE CHARACTERS

10: INKJET PRINTING DEVICE
11: PRINT WORKFLOW MANAGEMENT SERVER
12: ONLINE PROOFREADING SERVER
20: PERSONAL COMPUTER (OF CUSTOMER COMPANY)
30: PERSONAL COMPUTER (OF PRODUCTION COMPANY)
42: INTERNET
61: PRINT JOB REGISTRATION UNIT
62: JOB DATA STORAGE UNIT
63: AUTOMATIC GROUPING PROCESSING UNIT
64: PROOFREADING SCREEN DISPLAY UNIT
631: RIP PROCESSING UNIT
632: IMAGE DATA COMPARISON UNIT
633: GROUPING UNIT
641: MULTIPLE-IMAGE DISPLAY CONTROL UNIT
642: COMMENT INPUT RECEPTION UNIT
643: COMMENT REFLECTION UNIT
800: PROOFREADING SCREEN
6331: RELATED PAGE PAIR SETTING UNIT
6332: RELATED JOB GROUP DETERMINATION UNIT

The invention claimed is:

1. A proofreading assistance method that assists proofreading of an image to be printed, the proofreading assistance method comprising:

a print job registration step of, by an operator, registering K print jobs including one master job and (K−1) general jobs on a computer, the K print jobs each being associated with image data representing an image to be printed, where K is an integer of 2 or more;

an image data comparison step of, by the computer, comparing image data corresponding to each general job with image data corresponding to the master job to obtain a matching rate between an image corresponding to each general job and an image corresponding to the master job, and a common image area that is an image portion common between the image corresponding to each general job and the image corresponding to the master job;

a grouping step of, by the computer, defining a set of (N+1) print jobs including the master job and N general jobs as a related job group based on the matching rate obtained in the image data comparison step, where N is an integer of (K−1) or less;

a comment input step of, by an operator, inputting a comment regarding proofreading for an image corresponding to a proofreading target job with designating a comment input area in a state where the image corresponding to the proofreading target job is displayed on a display unit of the computer, the proofreading target job being one of the (N+1) print jobs; and a comment reflection step of, by the computer, reflecting a comment inputted with designating the common image area as the comment input area in the comment input step in an area corresponding to the comment input area, the area corresponding to the comment input area being in an image corresponding to a print job other than the proofreading target job among the (N+1) print jobs.

2. The proofreading assistance method according to claim 1, wherein in the image data comparison step, the matching rate is obtained for each combination of an image corresponding to one page of each general job and an image corresponding to one page of the master job, and the grouping step includes:

a related page pair setting step of, by the computer, defining two pages constituting the combination for which the matching rate greater than or equal to a predetermined threshold is obtained in the image data comparison step as a related page pair; and a related job group determination step of, by the computer, determining, with the (K−1) general jobs as a determination target job one by one, whether or not to include the determination target job in the related job group based on a result obtained in the related page pair setting step.

3. The proofreading assistance method according to claim 2, wherein in the related job group determination step, when at least one page of the determination target job is defined as the related page pair in the related page pair setting step, it is determined that the determination target job is included in the related job group.

4. The proofreading assistance method according to claim 2, wherein in the related job group determination step, when all pages of the determination target job are defined as the related page pair in the related page pair setting step, it is determined that the determination target job is included in the related job group.

5. The proofreading assistance method according to claim 2, wherein in the related job group determination step, when a predetermined ratio or more of pages among all pages of the determination target job are defined as the related page pair in the related page pair setting step, it is determined that the determination target job is included in the related job group.

6. The proofreading assistance method according to claim 1, further comprising a multiple-image display step of, by the computer, displaying images respectively corresponding to two or more print jobs among the (N+1) print jobs side by side on the display unit, wherein in a state in which images respectively corresponding to a first job and a second job that are two print jobs included in the related job group are displayed side by side on the display unit, when a display page for an image corresponding to the first job is changed to one of two pages constituting a related page pair by an operator, the computer changes a display page for an image corresponding to the second job to another of the two pages constituting the related page pair.

7. The proofreading assistance method according to claim 1, further comprising a multiple-image display step of, by the computer, displaying images respectively corresponding to two or more print jobs among the (N+1) print jobs side by side on the display unit.

8. The proofreading assistance method according to claim 7, wherein in the comment reflection step, the comment inputted with designating the common image area as the comment input area in the comment input step is reflected only on an image displayed on the display unit.

9. The proofreading assistance method according to claim 7, wherein in the comment reflection step, the comment inputted with designating the common image area as the comment input area in the comment input step is reflected on an image corresponding to each of all print jobs other than the proofreading target job among the (N+1) print jobs.

10. The proofreading assistance method according to claim 1, wherein when an image corresponding to the master job and an image corresponding to one of the N general jobs are displayed on the display unit in the multiple-image display step, mask display that displays an image of a specific pattern without displaying an image based on corresponding image data is performed for a different image area that is an area other than the common image area.

11. The proofreading assistance method according to claim 10, further comprising a mask display setting step of, by an operator, setting whether to enable or disable the mask display, wherein the mask display is performed only in a case where a setting is made to enable the mask display in the mask display setting step.

12. The proofreading assistance method according to claim 1, wherein when an image corresponding to the master job and an image corresponding to one of the N general jobs are displayed on the display unit in the multiple-image display step, a different image area that is an area other than the common image area is highlighted.

13. The proofreading assistance method according to claim 1, wherein a common comment and a normal comment are provided as comments that can be inputted in the comment input step, and in the comment reflection step, the computer reflects only the common comment in an area corresponding to the comment input area, the area corresponding to the comment input area being in an image corresponding to a print job other than the proofreading target job among the (N+1) print jobs.

14. The proofreading assistance method according to claim 1, wherein in the comment reflection step, the computer does not reflect a comment inputted to a different image area that is an area other than the common image area in the comment input step in an image corresponding to any of the print jobs.

15. A proofreading assistance system that assists proofreading of an image to be printed, the proofreading assistance system comprising:

a print job registration unit configured to register, by an operator, K print jobs including one master job and (K−1) general jobs, the K print jobs each being associated with image data representing an image to be printed, where K is an integer of 2 or more;

an image data comparison unit configured to compare image data corresponding to each general job with image data corresponding to the master job to obtain a matching rate between an image corresponding to each general job and an image corresponding to the master job, and a common image area that is an image portion common between the image corresponding to each general job and the image corresponding to the master job;

a grouping unit configured to define a set of (N+1) print jobs including the master job and N general jobs as a related job group based on the matching rate obtained by the image data comparison unit, where N is an integer of (K−1) or less;

a comment input reception unit configured to, in a state where an image corresponding to a proofreading target job that is one of the (N+1) print jobs is displayed on a display unit of a computer via a network, receive an input of a comment regarding proofreading for the image corresponding to the proofreading target job, the comment being inputted to a comment input area designated by an operator; and a comment reflection unit configured to reflect, in an area corresponding to the comment input area, a comment inputted with designating the common image area as the comment input area by an operator among comments received by the comment input reception unit, the area corresponding to the comment input area being in an image corresponding to a print job other than the proofreading target job among the (N+1) print jobs.

* * * * *